(12) United States Patent
Nishi et al.

(10) Patent No.: US 12,158,724 B2
(45) Date of Patent: Dec. 3, 2024

(54) ELECTROPHOTOGRAPHIC MEMBER, PROCESS CARTRIDGE, AND ELECTROPHOTOGRAPHIC IMAGE FORMING APPARATUS

(71) Applicant: CANON KABUSHIKI KAISHA, Tokyo (JP)

(72) Inventors: Akio Nishi, Tokyo (JP); Toru Ishii, Shizuoka (JP); Kazuaki Nagaoka, Shizuoka (JP); Tomoya Uesugi, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 452 days.

(21) Appl. No.: 17/663,305

(22) Filed: May 13, 2022

(65) Prior Publication Data

US 2022/0276579 A1    Sep. 1, 2022

Related U.S. Application Data

(63) Continuation of application No. PCT/JP2020/043199, filed on Nov. 19, 2020.

(30) Foreign Application Priority Data

Nov. 22, 2019 (JP) ................................. 2019-211868
Apr. 23, 2020 (JP) ................................. 2020-076693

(51) Int. Cl.
G03G 5/147    (2006.01)
G03G 15/08    (2006.01)

(52) U.S. Cl.
CPC ..... *G03G 5/14769* (2013.01); *G03G 5/14734* (2013.01); *G03G 15/0818* (2013.01)

(58) Field of Classification Search
CPC .......... G03G 5/14769; G03G 5/14734; G03G 15/0818
See application file for complete search history.

(56) References Cited

U.S. PATENT DOCUMENTS 4,390,611 A * 6/1983 Ishikawa ............... G03G 5/0679
430/58.65
4,554,231 A * 11/1985 Ishikawa ............... G03G 5/0637
430/72

(Continued)

FOREIGN PATENT DOCUMENTS

CN    101354561 A    1/2009
CN    103314330 A    9/2013

(Continued)

*Primary Examiner* — Jason L Vaughan
(74) *Attorney, Agent, or Firm* — VENABLE LLP

(57) ABSTRACT

An electrophotographic member includes an electro-conductive substrate, and an elastic layer as a surface layer, the elastic layer constituted by a single-layer, wherein the elastic layer includes a first resin, a second resin and an anion, the first resin is a crosslinked urethane resin, and the crosslinked urethane resin is a resin having a specific cationic structure in the molecule, the second resin is at least one of a crosslinked acrylic resin having an ether bond and a crosslinked epoxy resin having an ether bond, and in a first area of the elastic layer, the first are being from an outer surface of the elastic layer to a depth of 0.1 μm, the first resin and the second resin form an interpenetrating polymer network structure.

14 Claims, 4 Drawing Sheets

(56) References Cited

U.S. PATENT DOCUMENTS

| | | | |
|---|---|---|---|
| 6,154,625 A * | 11/2000 | Saiki | G03G 15/0928 |
| | | | 430/123.3 |
| 6,340,528 B1 | 1/2002 | Hsieh | |
| 6,810,225 B2 * | 10/2004 | Kitano | G03G 15/0291 |
| | | | 399/176 |
| 7,727,134 B2 | 6/2010 | Nakamura | |
| 7,797,833 B2 | 9/2010 | Nakamura | |
| 8,176,632 B2 | 5/2012 | Kawamura | |
| 8,600,273 B2 | 12/2013 | Yamada | |
| 8,706,011 B2 | 4/2014 | Anan | |
| 8,745,870 B2 | 6/2014 | Kawamura | |
| 8,837,985 B2 * | 9/2014 | Ishida | G03G 15/08 |
| | | | 399/119 |
| 8,846,287 B2 | 9/2014 | Yamada | |
| 8,913,930 B2 | 12/2014 | Ishii | |
| 8,980,423 B2 * | 3/2015 | Taniguchi | G03G 15/0233 |
| | | | 428/323 |
| 9,017,239 B2 | 4/2015 | Ishida | |
| 9,625,854 B2 | 4/2017 | Koyanagi | |
| 9,632,446 B2 * | 4/2017 | Matsuda | G03G 15/0208 |
| 9,846,407 B2 | 12/2017 | Nakamura | |
| 9,952,531 B2 | 4/2018 | Ishii | |
| 10,031,438 B2 | 7/2018 | Wakabayashi | |
| 10,310,447 B2 | 6/2019 | Morishita | |
| 10,539,891 B1 | 1/2020 | Ishii | |
| 10,571,825 B1 | 2/2020 | Urushihara | |
| 10,678,161 B2 | 6/2020 | Tsuru | |
| 10,705,449 B2 | 7/2020 | Ishida | |
| 10,712,684 B2 | 7/2020 | Wakabayashi | |
| 10,732,538 B2 | 8/2020 | Moriai | |
| 10,831,126 B2 | 11/2020 | Matsunaga | |
| 10,831,127 B2 | 11/2020 | Utsuno | |
| 10,942,471 B2 * | 3/2021 | Ogawa | G03G 15/0818 |
| 10,976,683 B2 | 4/2021 | Ishida | |
| 2012/0134714 A1 | 5/2012 | Takeuchi | |
| 2012/0201568 A1 | 8/2012 | Kurachi | |
| 2012/0281998 A1 | 11/2012 | Kikuchi | |
| 2013/0130022 A1 | 5/2013 | Uesugi | |
| 2013/0272755 A1 | 10/2013 | Takeuchi | |
| 2014/0105646 A1 | 4/2014 | Ishida | |
| 2015/0234311 A1 | 8/2015 | Imai | |
| 2017/0139336 A1 | 5/2017 | Nagaoka | |
| 2018/0011418 A1 | 1/2018 | Arimura | |
| 2018/0088476 A1 | 3/2018 | Takashima | |
| 2019/0302644 A1 | 10/2019 | Yamada | |
| 2019/0324383 A1 | 10/2019 | Arimura | |
| 2020/0004170 A1 | 1/2020 | Ishii | |
| 2020/0033742 A1 | 1/2020 | Komatsu | |
| 2020/0041921 A1 | 2/2020 | Yamaguchi | |
| 2022/0100113 A1 | 3/2022 | Tanaka | |
| 2022/0236663 A1 | 7/2022 | Uesugi | |

FOREIGN PATENT DOCUMENTS

| | | |
|---|---|---|
| CN | 104718501 A | 6/2015 |
| CN | 110389502 A | 10/2019 |
| JP | 2001-99137 A | 4/2001 |
| JP | 2003-202722 A | 7/2003 |
| JP | 2011-53658 A | 3/2011 |
| JP | 2012-215840 A | 11/2012 |
| JP | 2014-44411 A | 3/2014 |
| JP | 2017-72796 A | 4/2017 |
| JP | 2018-55090 A | 4/2018 |
| JP | 2019-185041 A | 10/2019 |
| JP | 2020-8847 A | 1/2020 |
| JP | 2020-24407 A | 2/2020 |

* cited by examiner

ELECTROPHOTOGRAPHIC MEMBER, PROCESS CARTRIDGE, AND ELECTROPHOTOGRAPHIC IMAGE FORMING APPARATUS

CROSS-REFERENCE TO RELATED APPLICATIONS

This application is a Continuation of International Patent Application No. PCT/JP2020/43199, filed Nov. 19, 2020, which claims the benefit of Japanese Patent Application No. 2019-211868, filed Nov. 22, 2019, and Japanese Patent Application No. 2020-076693, filed Apr. 23, 2020, all of which are hereby incorporated by reference herein in their entirety.

BACKGROUND

The present disclosure relates to an electrophotographic member. In addition, the present disclosure relates to a process cartridge and an electrophotographic image forming apparatus that have the electrophotographic member.

DESCRIPTION OF THE RELATED ART

In an electrophotographic image forming apparatus (also referred to as an "electrophotographic apparatus") according to one aspect, an image carrier is electrically charged by a charging unit, and an electrostatic latent image is formed by laser. Next, toner in a developing container is applied onto a developing member by a toner supplying roller and a toner regulating member, and development by the toner is performed due to contact or proximity between the image carrier and the developing member. After that, the toner on the image carrier is transferred to a recording paper by a transfer unit and is fixed by heat and pressure; and a toner remaining on the image carrier is removed by a cleaning blade.

An electrophotographic member provided with an electro-conductive layer, which is used for a developing roller or a charging roller in the electrophotographic apparatus, is required to control an electric resistance value of the electro-conductive layer to about $10^5$ to $10^9 \Omega$; and its electro-conductivity needs to be uniform over the whole of the member, and be stable over time. As an electro-conductive agent which is used for applying a predetermined electro-conductivity to the electro-conductive layer, there are an electro-conductive particle such as carbon black, and an ionic compound such as a quaternary ammonium salt. The ionic compound and carbon black have different electric properties, and both can be used in combination in the electro-conductive layer of the electrophotographic member.

In Japanese Patent Application Laid-Open No. 2003-202722, it is disclosed that fogging in a low humidity environment is suppressed by use of an electro-conductive roll having a surface layer that contains a resin having a urethane bond which is formed by a reaction of an ionic liquid having a cation structure having a hydroxyl group with an isocyanate. In addition, in Japanese Patent Application Laid-Open No. 2011-53658, an electro-conductive roller is described which has resistance stability at the time of continuous energization enhanced by a quaternary ammonium salt group which is incorporated into the main chain.

In recent years, an electrophotographic apparatus is required to maintain a high image quality and high durability even in an electrophotographic process at a higher speed. According to studies by the present inventors, the electro-conductive rollers according to Japanese Patent Application Laid-Open No. 2003-202722 and Japanese Patent Application Laid-Open No. 2011-53658 have caused image defects in a long-term durability test in a high-speed process, in some cases. For example, when a large number of sheets are printed in a high-temperature and high-humidity environment such as a temperature of 32° C. and a relative humidity of 95%, there has been a case where fogging has occurred in the electrophotographic image.

SUMMARY

At least one aspect of the present disclosure is directed to providing an electrophotographic member which can maintain the high image quality and the high durability even in the electrophotographic process at a high speed. Another aspect of the present disclosure is directed to providing a process cartridge that contributes to stable formation of an electrophotographic image of high quality. Further another aspect of the present disclosure is directed to providing an electrophotographic image forming apparatus that can stably form the electrophotographic image of the high quality.

According to one aspect of the present disclosure, there is provided an electrophotographic member including: an electro-conductive substrate; and an elastic layer as a surface layer, the elastic layer being constituted by a single-layer, wherein the elastic layer includes a first resin, a second resin and an anion, the first resin is a crosslinked urethane resin, the crosslinked urethane resin has at least one cationic structure selected from the group consisting of the following structural formulae (1) to (6) in a molecule, the second resin is at least one of a crosslinked acrylic resin having an ether bond (—C—O—C—) and a crosslinked epoxy resin having an ether bond (—C—O—C—), and in a first area of the elastic layer, the first area being from an outer surface of the elastic layer to a depth of 0.1 μm, the first resin and the second resin form an interpenetrating polymer network structure.

Structural Formula (1)

[In the structural formula (1), R1 represents a hydrogen atom, or a monovalent hydrocarbon group having 1 to 4 carbon atoms, and Z1 to Z3 each independently represent any structure selected from the group consisting of structures represented by structural formulae (Z101) and (Z102), or a monovalent hydrocarbon group having 1 to 4 carbon atoms, provided that at least one of Z1 to Z3 is any structure selected from the group consisting of the structures represented by the structural formulae (Z101) and (Z102)];

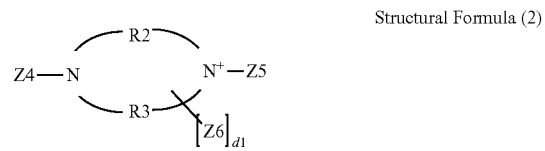

Structural Formula (2)

[in the structural formula (2), R2 and R3 each represent a divalent hydrocarbon group necessary for forming a nitrogen-containing heteroaromatic five-membered ring together with a nitrogen atom to which each is bonded, Z4 and Z5 each independently represent any structure selected from the group consisting of the structures represented by the structural formulae (Z101) and (Z102), a hydrogen atom, or a monovalent hydrocarbon group having 1 to 4 carbon atoms, Z6 represents any structure selected from the group consisting of the structures represented by the structural formulae (Z101) and (Z102), or a monovalent hydrocarbon group having 1 to 4 carbon atoms, and d1 represents an integer of 0 or 1, provided that at least one of Z4 to Z6 is any structure selected from the group consisting of the structures represented by the structural formulae (Z101) and (Z102)];

Structural Formula (3)

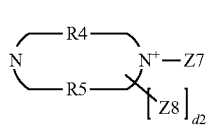

[in the structural formula (3), R4 and R5 each represent a divalent hydrocarbon group necessary for forming a nitrogen-containing heteroaromatic six-membered ring together with a nitrogen atom to which each is bonded, Z7 represents any structure selected from the group consisting of the structures represented by the structural formulae (Z101) and (Z102), a hydrogen atom, or a monovalent hydrocarbon group having 1 to 4 carbon atoms, Z8 represents any structure selected from the group consisting of the structures represented by the structural formulae (Z101) and (Z102), or a monovalent hydrocarbon group having 1 to 4 carbon atoms, and d2 represents an integer of 0 to 2, and when d2 is 2, Z8 may be the same or different from each other; provided that at least one of Z7 and Z8 is any structure selected from the group consisting of the structures represented by the structural formulae (Z101) and (Z102)];

Structural Formula (4)

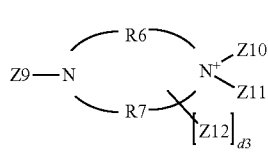

[in the structural formula (4), R6 and R7 each represent a divalent hydrocarbon group necessary for forming a nitrogen-containing heteroalicyclic group together with a nitrogen atom to which each is bonded, Z9 to Z11 each independently represent any structure selected from the group consisting of the structures represented by the structural formulae (Z101) and (Z102), a hydrogen atom, or a monovalent hydrocarbon group having 1 to 4 carbon atoms, Z12 represents any structure selected from the group consisting of the structures represented by the structural formulae (Z101) and (Z102), or a monovalent hydrocarbon group having 1 to 4 carbon atoms, d3 represents an integer of 0 to 2, and when d3 is 2, Z12 may be the same or different from each other; provided that at least one of Z9 to Z12 is any structure selected from the group consisting of the structures represented by the structural formulae (Z101) and (Z102)];

Structural Formula (5)

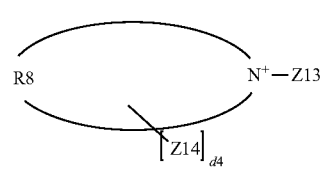

[in the structural formula (5), R8 represents a divalent hydrocarbon group necessary for forming a nitrogen-containing aromatic ring together with a nitrogen atom to which R8 is bonded, Z13 represents any structure selected from the group consisting of the structures represented by the structural formulae (Z101) and (Z102), a hydrogen atom, or a monovalent hydrocarbon group having 1 to 4 carbon atoms, Z14 represents any structure selected from the group consisting of the structures represented by the structural formulae (Z101) and (Z102), or a monovalent hydrocarbon group having 1 to 4 carbon atoms, and d4 represents an integer of 0 or 1, provided that at least one of Z13 and Z14 is any structure selected from the group consisting of the structures represented by the structural formulae (Z101) and (Z102)];

Structural Formula (6)

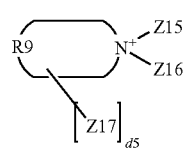

[in the structural formula (6), R9 represents a divalent hydrocarbon group necessary for forming a nitrogen-containing alicyclic group together with a nitrogen atom to which R9 is bonded, Z15 and Z16 each independently represent any structure selected from the group consisting of the structures represented by the structural formulae (Z101) and (Z102), a hydrogen atom, or a monovalent hydrocarbon group having 1 to 4 carbon atoms, Z17 represents any structure selected from the group consisting of the structures represented by the structural formulae (Z101) and (Z102), or a monovalent hydrocarbon group having 1 to 4 carbon atoms, and d5 represents an integer of 0 or 1, provided that at least one of Z15 to Z17 is any structure selected from the group consisting of the structures represented by the structural formulae (Z101) and (Z102)]; and Structural Formula (Z101)

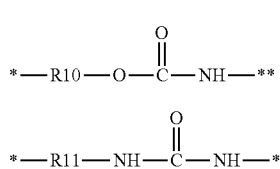

Structural Formula (Z102)

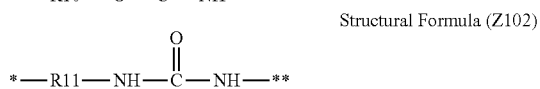

[in the structural formulae (Z101) and (Z102), R10 and R11 each independently represent a divalent hydrocarbon group having a straight chain or a branch, the symbol "*" represents a bonding site for bonding to a nitrogen atom in the structural formula (1), or a bonding site for bonding to a nitrogen atom in a nitrogen-containing heterocyclic ring or a carbon atom in the nitrogen-containing heterocyclic ring in the structural formulae (2) to (6), and the symbol "**"

represents a bonding site for bonding to a carbon atom in a polymer chain constituting the resin having a cationic structure.].

According to another aspect of the present disclosure, there is provided an electrophotographic member including: an electro-conductive substrate; and an elastic layer as a surface layer, the elastic layer being constituted by a single-layer, wherein the elastic layer includes a first resin, a second resin and an anion, the first resin is a crosslinked urethane resin, the crosslinked urethane resin has at least one cationic structure selected from the group consisting of the above structural formulae (1) to (6) in a molecule, the second resin is at least one of a crosslinked acrylic resin having an ether bond and a crosslinked epoxy resin having an ether bond, a first area in the elastic layer, the first area being from an outer surface of an elastic layer to a depth of 0.1 μm includes the first resin and the second resin, and when a peak top temperature of a thermal chromatogram derived from the second resin measured from the first sample sampled from the first area is defined as A1 (° C.), and a peak top temperature of a thermal chromatogram derived from the second resin measured from a second sample obtained by decomposing the first resin contained in the sample is defined as A2 (° C.), A1 and A2 satisfy a relationship expressed by the following Expression (1):

$$A1 > A2. \qquad \text{Expression (1)}$$

In addition, according to another aspect of the present disclosure, there is provided an electrophotographic process cartridge configured to be detachably attachable to a main body of an electrophotographic apparatus, having the above electrophotographic member.

Furthermore, according to another aspect of the present disclosure, there is provided an electrophotographic image forming apparatus including an image carrier that carries an electrostatic latent image thereon, a charging apparatus that primarily charges the image carrier, an exposure apparatus that forms the electrostatic latent image on the image carrier that is primarily charged, a developing member that develops the electrostatic latent image with toner to form a toner image, and a transfer apparatus that transfers the toner image to a transfer material, wherein the developing member is the above electrophotographic member.

Further features of the present disclosure will become apparent from the following description of exemplary embodiments with reference to the attached drawings.

DESCRIPTION OF THE EMBODIMENTS

Figure 1A:
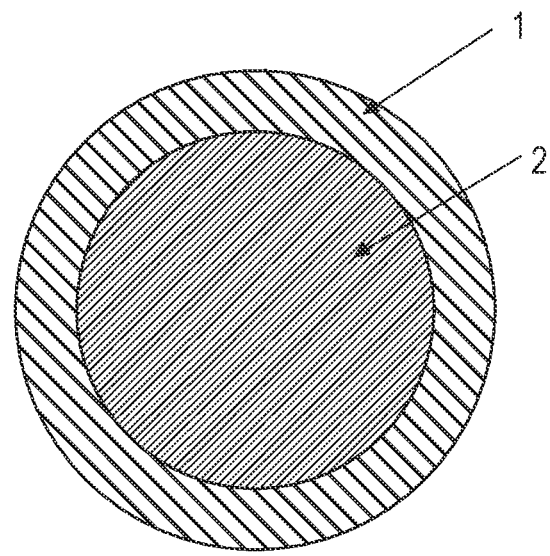
FIG. 1A is a conceptual diagram illustrating one example of a developing member according to the present disclosure.

The present inventors have found that when the electro-conductive rollers according to Japanese Patent Application Laid-Open No. 2003-202722 and Japanese Patent Application Laid-Open No. 2011-53658 are used as developing rollers, fogging occurs in an electrophotographic image when a large number of sheets are printed in a high-temperature and high-humidity environment, and have studied the mechanism thereof. In the process, it has been found that the amount of electrostatic charge of toner which is carried on the surface of the electro-conductive roller in a step of forming the electrophotographic image decreases as compared with that in the initial stage. Then, the present inventors have presumed the cause of the decrease in the amount of the electrostatic charge of the toner, in the following way.

In a step of forming a large number of the electrophotographic images, anions in the surface layer of the electro-conductive roller are unevenly distributed on the side closer to the substrate in the surface layer. Then, due to the decrease in the concentration of the anion which is a counter ion, the concentration of the free cation relatively increases on the outer surface of the electro-conductive roller. The free cations in the vicinity of the surface increase the molecular mobility in a high-temperature and high-humidity environment. It is presumed that because of this, the electric charges of the toner particles in direct contact with the outer surface of the electro-conductive roller become to be easily transferred to the electro-conductive roller, and the amount of the electrostatic charge of the toner has decreased.

Then, the present inventors have studied to obtain an electrophotographic member that can suppress the transfer of the electric charge from the toner particle to the electro-conductive roller.

As a result, the present inventors have found that, according to an electrophotographic member in which a specific structure is introduced into the surface layer, the transfer of the electric charges from the toner particles is more reliably suppressed even in the high-temperature and high-humidity environment.

The electrophotographic member according to one embodiment of the present disclosure has an electro-conductive substrate, and a single-layer elastic layer as a surface layer. The elastic layer includes a first resin, a second resin and an anion. The first resin is a crosslinked urethane resin which has a specific cationic structure in the molecule. In addition, the second resin is at least one of a crosslinked acrylic resin having an ether bond and a crosslinked epoxy resin having an ether bond. Then, the first resin and the second resin form an interpenetrating polymer network structure, in a first area that is an area from the outer surface of the elastic layer to a depth of 0.1 μm.

The present inventors have inferred the reason why such an electrophotographic member can suppress the occurrence of fogging even in the durable use of printing of a large number of sheets in the high-temperature and high-humidity environment, in the following way.

The above specific cationic structure includes a urethane bond which is formed by a reaction between a hydroxyl group and an isocyanate group, or a urea bond which is formed by a reaction between an amino group and an isocyanate group. The urethane bonds with each other, the urea bonds with each other, and the urethane bond and the urea bond interact with each other, and form hard segments, respectively. As a result, the mobility of a polymer chain of the crosslinked urethane resin (first resin) is suppressed which has the cationic structure. In addition, the second resin forms the interpenetrating polymer network structure with the first resin, in the first area that is an area from the outer surface of the elastic layer to the depth of 0.1 µm. Furthermore, the ether bond which the second resin has interacts with the urethane bond or the urea bond, and thereby the mobility itself of the hard segment itself is also suppressed. As a result, the molecular mobility of the polymer chain of the crosslinked urethane resin is more reliably suppressed even in the high-temperature and high-humidity environment. It is considered that as a result, the transfer of the electric charges from the toner particles can be more reliably suppressed even in the high-temperature and high-humidity environment.

<Interpenetrating Polymer Network Structure>

The interpenetrating polymer network structure (hereinafter referred to as "IPN structure") is a structure in which network structures of two or more polymers are intertwined and entangled with each other without being combined by covalent bonds. Then, this structure does not come untied unless the molecular chains forming the network are cut.

Methods for forming the IPN structure can include several methods. For example, there is a sequential network forming method of forming a network of a polymer of a first component in advance, subsequently swelling the network with a monomer of a second component and a polymerization initiator, and then forming a network of a polymer of a second component. Alternatively, there is a simultaneous network forming method of mixing a monomer of the first component, a monomer of the second component, which have different reaction mechanisms from each other, and further respective polymerization initiators, and forming the network at the same time.

In the present embodiment, the IPN structure is formed from the crosslinked urethane resin, and the crosslinked acrylic resin having an ether bond, or the epoxy resin having an ether bond. The IPN structure is formed by impregnating the crosslinked urethane resin of the first resin, with an acrylic monomer or a glycidyl ether monomer and a polymerization initiator, from the outer surface of the electro-conductive roller, and then polymerizing the acrylic monomer or the glycidyl ether monomer to form the second resin. As a result, the acrylic monomer or the glycidyl ether monomer penetrates between the three-dimensional network structures of the crosslinked urethane resin, and is polymerized, and thereby the IPN structure is formed.

Furthermore, the ether bond which the second resin has also interacts with the urethane bond or the urea bond contained in the crosslinked urethane resin. As a result, the molecular mobility of the hard segment is more reliably suppressed which is formed by the interaction between the urethane bond and the urea bond.

In the present embodiment, the molecular mobility of a urethane-bonded site or a urea-bonded site of the crosslinked urethane resin is suppressed, but because the cation structure is also bonded to the crosslinked urethane resin through the urethane bond or the urea bond, the molecular mobility of the cation structure portion is also suppressed. As a result, even after a large number of sheets have been printed in the high-temperature and high-humidity environment, the transfer of the electric charges of the toner particles to the electro-conductive roller is suppressed.

The electrophotographic member according to the present disclosure will be described below by a roller-shaped developing member (developing roller), but the shape of the electrophotographic member is not limited to this.

FIG. 1A is a cross-sectional view in the circumferential direction of a roller-shaped electrophotographic member which has an electro-conductive shaft core 2 as an electro-conductive substrate, and a surface layer 1 on the peripheral surface of the substrate.

Figure 1B:
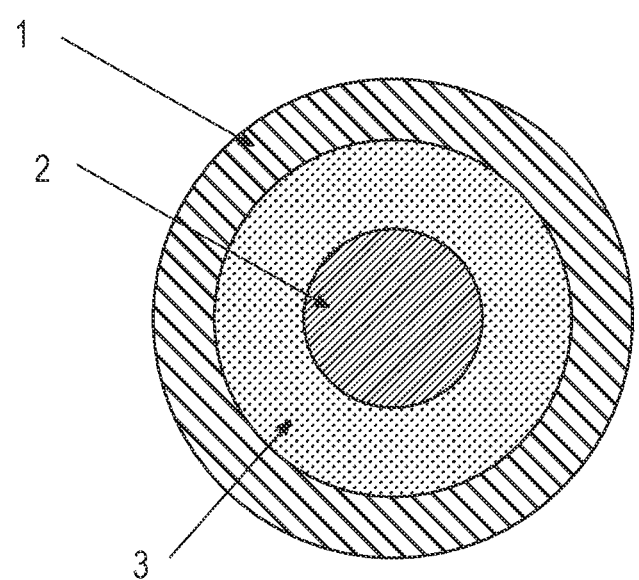
FIG. 1B is a conceptual diagram illustrating one example of the developing member according to the present disclosure.

FIG. 1B is a cross-sectional view in the circumferential direction of the roller-shaped electrophotographic member which has the shaft core 2 as the electro-conductive substrate, and an intermediate layer 3 between the surface layer 1 and the shaft core 2. The intermediate layer 3 is not limited to a single layer, but may be a plurality of layers. For example, in a process of a non-magnetic one component contact development system, the electrophotographic member is preferably used which has the surface layer 1 provided on the electro-conductive substrate having the intermediate layer 3 laminated on the shaft core 2.

[Electro-Conductive Substrate]

As the electro-conductive substrate, an electro-conductive shaft core having a columnar shape or a hollow cylindrical shape, or a substrate can be used which has further one or a plurality of electro-conductive intermediate layers on such a shaft core. The shape of the shaft core is the columnar shape or the hollow cylindrical shape, and the shaft core is formed from the following electro-conductive materials: metals or alloys such as aluminum, copper alloys and stainless steel; iron plated with chromium or nickel; and synthetic resins having electro-conductivity. A known adhesive can be applied onto the surface of the shaft core 2, for the purpose of improving the adhesiveness to the intermediate layer 3, the surface layer 1 or the like, on the outer periphery of the shaft core 2.

[Intermediate Layer]

As previously described, in the process of the non-magnetic one component contact developing system, the electrophotographic member is preferably used in which the intermediate layer 3 is laminated between the shaft core 2 and the surface layer 1. The intermediate layer imparts such hardness and elasticity as to be pressed against the image carrier with an appropriate nip width and nip pressure, to the developing member, in order that the developing member can supply the toner to the electrostatic latent image formed on the surface of the image carrier without excess or deficiency.

It is usually preferable that the intermediate layer is formed of a molded body of a rubber material. Examples of the rubber materials include the following: ethylene-propylene-diene copolymer rubber (EPDM), acrylonitrile-butadiene rubber (NBR), chloroprene rubber (CR), natural rubber (NR), isoprene rubber (IR), styrene-butadiene rubber (SBR), fluororubber, silicone rubber, epichlorohydrin rubber, hydride of NBR, and urethane rubber. These can be used singly or in combination of two or more thereof. Among these, the silicone rubber is particularly preferable which resists causing a compression permanent strain even when another member (such as toner regulating member) has come into contact over a long period of time. Specific examples of the silicone rubber include a cured product of an addition curing type of silicone rubber.

The intermediate layer can be an intermediate layer in which an electro-conductivity imparting agent such as an electron conductive substance or an ion conductive substance is blended into the above rubber material. The volume resistivity of the intermediate layer is preferably adjusted to $10^3$ Ωcm or higher and $10^{11}$ Ωcm or lower, and is more preferably adjusted to $10^4$ Ωcm or higher and $10^{10}$ Ωcm or lower.

Examples of the electron conductive substance include the following substances: carbon black such as electro-conductive carbon, carbon for rubber, carbon for color (ink); electro-conductive carbon black, for example, such as Ketchen black EC, and acetylene black; carbon for rubber such as SAF, ISAF, HAF, FEF, GPF, SRF, FT and MT; carbon for color (ink), which has been subjected to oxidizing treatment; metals such as copper, silver and germanium; and oxides of the metals thereof. Among these, the electro-conductive carbon (electro-conductive carbon, carbon for rubber, and carbon for color (ink)) is preferable because it is easy to control the electro-conductivity with a small amount.

Examples of the ion conductive substance include the following substances: inorganic ion conductive substances such as sodium perchlorate, lithium perchlorate, calcium perchlorate, and lithium chloride; and organic ion conductive substances such as modified aliphatic dimethylammonium ethosulfate, and stearyl ammonium acetate.

These electro-conductivity imparting agents are used in an amount necessary for adjusting the intermediate layer to an appropriate volume resistivity as described above, and are generally used in a range of 0.5 parts by mass or more and 50 parts by mass or less with respect to 100 parts by mass of a binder resin.

In addition, if necessary, the intermediate layer can further contain various additives such as a plasticizer, a filler, an extender, a vulcanizing agent, a vulcanization aid, a cross-linking aid, a curing inhibitor, an antioxidant, an anti-aging agent, and a processing aid. Examples of the filler include silica, a quartz powder and calcium carbonate. These optional components are blended in an amount within a range that does not obstruct the function of the intermediate layer.

It is preferable for the intermediate layer to have elasticity required for the developing member, have Asker C hardness of 20 degrees or higher and 100 degrees or lower, and have a thickness of 0.3 mm or larger and 6.0 mm or smaller.

The materials for the intermediate layer can be mixed with the use of a dynamic mixing apparatus such as a uniaxial continuous kneader, a biaxial continuous kneader, a twin roll, a kneader mixer and a Trimix, or a static mixing apparatus such as a static mixer.

A method for forming the intermediate layer on the shaft core is not particularly limited, and examples thereof include a die molding method, an extrusion molding method, an injection molding method, and a coating molding method. The die molding method can include, for example, a method of: firstly, fixing pieces for holding the shaft core in a mold to both ends of a cylindrical mold; forming an injection port in the piece; subsequently, placing the shaft core in the mold; injecting a material for the intermediate layer from the injection port; then heating the mold at a temperature at which the material is cured; and removing the mold. The extrusion molding method includes, for example, a method of: using a cross-head extruding machine; extruding the shaft core together with a material for the intermediate layer; curing the material; and thereby forming the intermediate layer around the shaft core.

The surface of the intermediate layer can also be modified by a surface modification method of surface polishing, corona treatment, flame treatment or excimer treatment, in order to improve its adhesiveness to the surface layer.

[Surface Layer]

The surface layer constituting the outer surface serving as a toner carrying surface of the electrophotographic member is provided on the outermost peripheral surface, in the case of a roller-shaped member having a single-layer elastic layer formed thereon. The surface layer can be formed directly on the shaft core, or can also be formed on the outer peripheral surface of the substrate in which the intermediate layer is provided on the shaft core.

The surface layer includes: a first resin which is a cross-linked urethane resin; a second resin which is at least one of a crosslinked acrylic resin having an ether bond and a crosslinked epoxy resin having an ether bond; and an anion. In addition, in the surface area (first area) from the outer surface to a depth of 0.1 μm, the crosslinked urethane resin and the crosslinked acrylic resin or the crosslinked epoxy resin form the IPN structure.

The outer layer may contain resin particles in order to form protrusions on the outer surface of the electrophotographic member.

In addition, the surface layer may contain fine particles in order to roughen the outer surface. Specifically, usable fine particles include fine particles of a polyurethane resin, a polyester resin, a polyether resin, a polyamide resin, an acrylic resin and a polycarbonate resin. These fine particles are also preferably cross-linked resin particles. When the IPN structure is formed on the outer surface side of the surface layer, the IPN structure is also formed in the inside of the crosslinked resin particle, in some cases. A volume average particle size of the fine particles is preferably 1.0 μm or larger and 30 μm or smaller, and the surface roughness (ten-point average roughness) Rzjis, which is formed by the fine particles, is preferably 0.1 μm or larger and 20 μm or smaller. For information, Rzjis is a value measured based on JIS B0601 (1994).

[Method for Forming Surface Layer]

A method of forming the surface layer will be described below, according to an embodiment of the surface layer in which the IPN structure is formed by a crosslinked acrylic resin or a crosslinked epoxy resin.

The surface layer in the present embodiment can be formed by the following steps (I) to (III):

(I) forming a resin layer including the crosslinked urethane resin as the first resin, on the electro-conductive substrate;
(II) impregnating the outer surface of the resin layer with a liquid acrylic monomer or glycidyl ether monomer; and
(III) curing the impregnated acrylic monomer or glycidyl ether monomer.

Figure 2:
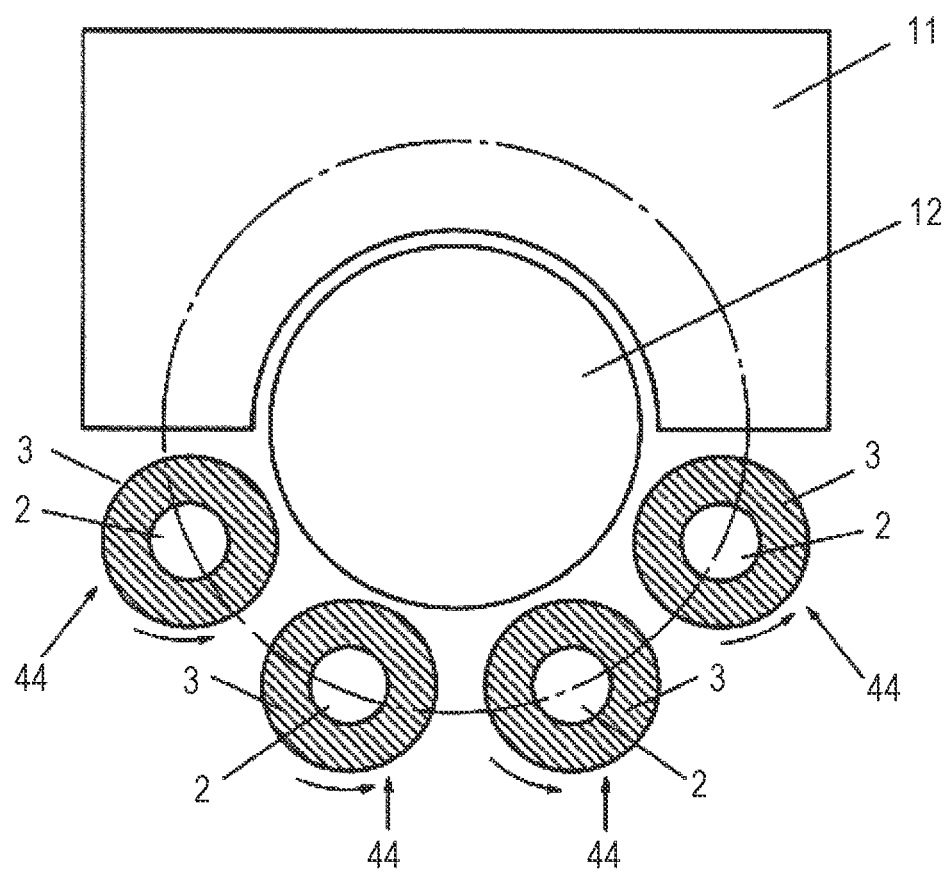
FIG. 2 is a schematic view (schematic cross-sectional view) of a method for irradiating an electro-conductive substrate according to the present disclosure with excimer UV light.

The electro-conductive substrate may be surface-treated prior to the step of forming the resin layer containing the crosslinked urethane resin as the first resin, on the electro-conductive substrate. FIG. 2 illustrates a schematic view (schematic cross-sectional view) of a method for irradiating an electro-conductive substrate 44 having the intermediate layer 3 thereon according to the present disclosure, with excimer UV light. As is illustrated in FIG. 2, four electro-conductive substrates 44 are arranged on a concentric circle of an excimer UV lamp 12 which is mounted in a holder 11 with a built-in water-cooled heat sink, and the electro-conductive substrates 44 are irradiated with excimer light emitted from the excimer UV lamp 12, while being rotated; and the intermediate layer 3 is surface-treated.

The formation of the resin layer containing the cross-linked urethane resin is not particularly limited, but a method of applying and molding a liquid coating material is preferable. For example, the resin layer can be formed by: dispersing and mixing each material for the resin layer in a solvent to form a coating material; applying the coating material onto the electro-conductive substrate; and drying and solidifying or heating and curing the coating material. As the solvent, a polar solvent is preferable from the viewpoint of compatibility with a polyol or an isocyanate compound which is a raw material of the crosslinked urethane resin. Examples of the polar solvent include: alcohols such as methanol, ethanol and n-propanol; ketones such as acetone, methyl ethyl ketone and methyl isobutyl ketone; and esters such as methyl acetate and ethyl acetate. Among these solvents, one solvent or a mixture of two or more solvents can be used which have adequate compatibility with the other materials. In addition, a solid content at the time when the coating material is formed can be freely adjusted by an amount of the solvent to be mixed. For dispersion and mixing, a known dispersing apparatus which uses beads can be used, such as a sand mill, a paint shaker, a dyno mill and a pearl mill. As the coating method, dip coating, ring coating, spray coating or roll coating can be used.

The drying and solidification or heat curing is not particularly limited as long as the crosslinking of the urethane resin proceeds, and is preferably performed at a temperature of 50° C. or higher, and more preferably at a temperature of 70° C. or higher.

Next, the resin layer formed as described above is impregnated with the liquid acrylic monomer or glycidyl ether monomer. The liquid acrylic monomer or glycidyl ether monomer in the state or in a form of being appropriately diluted by various solvents can be used as an impregnation treatment liquid for the impregnation. When the liquid acrylic monomer or glycidyl ether monomer is appropriately diluted by various solvents, the surface layer can be formed which has a more uniform surface composition.

The solvent can be freely selected as long as the solvent satisfies both the affinity with the resin layer and the solubility of the acrylic monomer or glycidyl ether monomer. Examples thereof include: alcohols such as methanol, ethanol and n-propanol; ketones such as acetone, methyl ethyl ketone and methyl isobutyl ketone; and esters such as methyl acetate and ethyl acetate. In addition, the impregnation treatment liquid may be appropriately mixed with a polymerization initiator. Details of the polymerization initiator will be described later. An impregnation method of the impregnation treatment liquid is not particularly limited, and dip coating, ring coating, spray coating or roll coating can be used.

After the impregnation treatment with the impregnation treatment liquid has been thus finished, the acrylic monomer or the glycidyl ether monomer is polymerized and cured, and thereby the surface layer can be formed. The polymerization and curing method is not particularly limited, and known methods can be used. Specific examples thereof include methods of thermal curing and ultraviolet irradiation.

Due to such a process, the crosslinked acrylic resin or the crosslinked epoxy resin is introduced into the network structure of the crosslinked urethane resin of the resin layer, in a form of being entangled with each other, and thereby can form the IPN structure. The IPN structure is formed by: impregnating the crosslinked urethane resin of the first resin with the acrylic monomer or the glycidyl ether monomer and the polymerization initiator from the outer surface of the developing member; and then forming the crosslinked acrylic resin or the crosslinked epoxy resin as the second resin. In this case, the acrylic monomer or the glycidyl ether monomer penetrates into the three-dimensional network structure of the crosslinked urethane resin, is polymerized there, and forms the network structure of the crosslinked acrylic resin or the crosslinked epoxy resin.

A film thickness of the surface layer obtained in this way is preferably 2.0 μm or larger and 150.0 μm or smaller, from the viewpoint of film strength and flexibility. For information, the film thickness of the surface layer described here refers to a film thickness of a portion excluding a portion which protrudes in a salient shape due to the addition of a roughening particle or the like.

[Crosslinked Urethane Resin]

The crosslinked urethane resin has excellent flexibility and strength, and accordingly is suitable as a binder. The urethane resin can be obtained from a polyol, an isocyanate, and if necessary, a chain extender.

Examples of the polyol include a polyether polyol, a polyester polyol, a polycarbonate polyol, a polyolefin polyol, an acrylic polyol, and a mixture thereof.

Examples of the isocyanate include the following substances:

tolylene diisocyanate (TDI), diphenylmethane diisocyanate (MDI), Naphthalene diisocyanate (NDI), tolidine diisocyanate (TODI), hexamethylene diisocyanate (HDI), isophorone diisocyanate (IPDI), phenylene diisocyanate (PPDI), xylylene diisocyanate (XDI), tetramethyl xylylene diisocyanate (TMXDI) and cyclohexane diisocyanate; and mixtures thereof.

Examples of the chain extender include: difunctional low molecular weight diols such as ethylene glycol, 1,4-butanediol and 3-methylpentanediol; trifunctional low molecular weight triols such as trimethylolpropane; and mixtures thereof.

In addition, a prepolymer type of isocyanate compound may be used which is obtained by a preliminary reaction of the above various isocyanate compounds with various polyols, in a state in which the isocyanate group is excessive, and has an isocyanate group at a terminal. In addition, as these isocyanate compounds, a material may be used in which an isocyanate group is blocked with various blocking agents such as MEK oxime.

In the case where any material is used, the urethane resin can be obtained by a reaction of the polyol with the isocyanate by heating. Furthermore, when either one or both of the polyol and the isocyanate have a branched structure and have three or more functional groups, the obtained urethane resin becomes the crosslinked urethane resin.

The crosslinked urethane resin according to the present disclosure has at least one cationic structure selected from the group consisting of the structural formulae (1) to (6), in the molecule.

The crosslinked urethane resin having the cationic structure is obtained, for example, by a reaction of an ionic compound having at least one functional group derived from a hydroxyl group or an amino group, with a binder resin. As the binder resin, it is preferable to use a binder resin obtained by a reaction of a chemical compound other than an ionic compound, preferably a polyol, with a polyisocyanate.

The ionic compound is a precursor of at least one cationic structure selected from the group consisting of structures represented by the structural formulae (1) to (6). The structures represented by the structural formulae (1) to (6) will be described below.

Structural Formula (1)

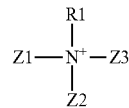

In the structural formula (1), R1 represents a hydrogen atom, or a monovalent hydrocarbon group having 1 to 4 carbon atoms. As the hydrocarbon group, an alkyl group is preferable. Z1 to Z3 each independently represent any structure selected from the group consisting of structures represented by structural formulae (Z101) and (Z102), or a monovalent hydrocarbon group having 1 to 4 carbon atoms. However, at least one of Z1 to Z3 is any structure selected from the group consisting of the structures represented by the structural formulae (Z101) and (Z102). As the monovalent hydrocarbon group, an alkyl group is preferable.

The structure represented by the structural formula (1) is, for example, a structure derived from an ionic compound having an ammonium cation which has at least one of a hydroxyl group and an amino group. In other words, when the ionic compound has at least one hydroxyl group, a crosslinked urethane resin having at least one structure represented by the structural formula (Z101) is obtained by a reaction of the hydroxyl group with an isocyanate group. In addition, when the ionic compound has at least one amino group, a crosslinked urethane resin having at least one structure represented by the structural formula (Z102) is obtained by a reaction of the amino group with the isocyanate group.

As for examples of the cation of the ionic compound which can form the structure represented by the structural formula (1), ammonium cations having a hydroxyl group include the following substances:
2-hydroxyethyltrimethylammonium cation, 2-hydroxyethyltriethylammonium cation, 4-hydroxybutyltrimethylammonium cation, 4-hydroxybutyl-tri-n-butylammonium cation, 8-hydroxyoctyltrimethylammonium cation, and 8-hydroxyoctyl-tri-n-butylammonium cation;
bis(hydroxymethyl)dimethylammonium cation, bis(2-hydroxyethyl) dimethylammonium cation, bis(3-hydroxypropyl) dimethylammonium cation, bis(4-hydroxybutyl) dimethylammonium cation, bis(8-hydroxyoctyl) dimethylammonium cation and bis(8-hydroxyoctyl)-di-n-butylammonium cation; and
tris(hydroxymethyl)methylammonium cation, tris(2-hydroxyethyl) methylammonium cation, tris(3-hydroxypropyl) methylammonium cation, tris(4-hydroxybutyl) methylammonium cation and tris(8-hydroxyoctyl) methylammonium cation; and derivatives thereof.

Examples of the ammonium cations having the amino group include cations having a structure in which a part or all of the hydroxyl groups possessed by the above cations are substituted with the amino group.

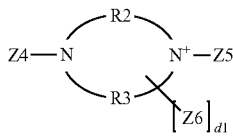

Structural Formula (2)

In the structural formula (2), R2 and R3 each represent a divalent hydrocarbon group necessary for forming a nitrogen-containing heteroaromatic five-membered ring together with a nitrogen atom to which each is bonded. In order to form an aromatic five-membered ring together with the two nitrogen atoms, either one of R2 and R3 is a hydrocarbon group having 1 carbon atom and the other is a hydrocarbon group having 2 carbon atoms.

The nitrogen-containing heteroaromatic five-membered ring according to the structural formula (2) can have a substituent Z6 other than a hydrogen atom. Z6 represents any structure selected from the group consisting of the structures represented by the structural formulae (Z101) and (Z102), or a monovalent hydrocarbon group having 1 to 4 carbon atoms. As the monovalent hydrocarbon group, an alkyl group is preferable. The suffix d1 represents an integer of 0 or 1.

Z4 and Z5 each independently represent any structure selected from the group consisting of the structures represented by the structural formulae (Z101) and (Z102), a hydrogen atom, or a monovalent hydrocarbon group having 1 to 4 carbon atoms. As the monovalent hydrocarbon group, an alkyl group is preferable. In addition, at least one of Z4 to Z6 is any structure selected from the group consisting of the structures represented by the structural formulae (Z101) and (Z102).

The structure represented by the structural formula (2) is, for example, a structure derived from an ionic compound having a nitrogen-containing heteroaromatic five-membered ring cation which has at least one of a hydroxyl group and an amino group, and contains two nitrogen atoms. In other words, when the ionic compound has at least one hydroxyl group, a urethane resin having at least one structure represented by the structural formula (Z101) is obtained by a reaction of the hydroxyl group with an isocyanate group. In addition, when the ionic compound has at least one amino group, a crosslinked urethane resin having at least one structure represented by the structural formula (Z102) is obtained by a reaction of the amino group with the isocyanate group.

Specific examples of the structural formula (2) include a structure represented by the following structural formula (2)-1.

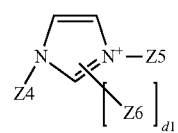

Structural formula (2)-1

In the structural formula (2)-1, the definitions of Z4 to Z6 and d1 are synonymous with Z4 to Z6 and d1 in the structural formula (2).

As for examples of the cation of the ionic compound which can form the structure represented by the structural formula (2), cations having an imidazolium ring structure and having a hydroxyl group include the following substances: 1-methyl-3-hydroxymethyl imidazolium cation, 1-methyl-3-(2-hydroxyethyl)imidazolium cation, 1-methyl-3-(3-hydroxypropyl)imidazolium cation, 1-methyl-3-(4-hydroxybutyl)imidazolium cation, 1-methyl-3-(6-hydroxyhexyl)imidazolium cation, 1-methyl-3-(8-hydroxyoctyl) imidazolium cation, 1-ethyl-3-(2-hydroxyethyl) imidazolium cation, 1-n-butyl-3-(2-hydroxyethyl) imidazolium cation, 1,3-dimethyl-2-(2-hydroxyethyl) imidazolium cation, 1,3-dimethyl-2-(4-hydroxybutyl) imidazolium cation, and 1,3-dimethyl-4-(2-hydroxyethyl) imidazolium cation;
1,3-bis-hydroxymethyl imidazolium cation, 1,3-bis(2-hydroxyethyl)imidazolium cation, 2-methyl-1,3-bis-hydroxymethyl imidazolium cation, 2-methyl-1,3-bis(2-hydroxyethyl)imidazolium cation, 4-methyl-1,3-bis(2-hydroxyethyl)imidazolium cation, 2-ethyl-1,3-bis(2-hydroxyethyl)imidazolium cation, 4-ethyl-1,3-bis(2-hydroxyethyl)imidazolium cation, 2-n-Butyl-1,3-bis(2-hydroxyethyl)imidazolium cation, 4-n-butyl-1,3-bis(2- hydroxyethyl)imidazolium cation, 1,3-bis(3-hydroxypropyl)imidazolium cation, 1,3-bis(4-hydroxybutyl)imidazolium cation, 1,3-bis(6-hydroxyhexyl)imidazolium cation, 1,3-bis(8-hydroxyoctyl)imidazolium cation, 1-methyl-2,3-bis(2-hydroxyethyl)imidazolium cation, 1-methyl-3,4-bis(2-hydroxyethyl)imidazolium cation, and 1-methyl-3,5-bis(2-hydroxyethyl)imidazolium cation;
1,2,3-trishydroxymethyl imidazolium cation, 1,2,3-tris(2-hydroxyethyl)imidazolium cation, 1,2,3-tris(3-hydroxypropyl)imidazolium cation, 1,2,3-tris(4-hydroxybutyl)imidazolium cation, 1,2,3-tris(6-hydroxyhexyl)imidazolium cation, 1,2,3-tris(8-hydroxyoctyl)imidazolium cation, 1,3,4-tris(2-hydroxyethyl)imidazolium cation, 1,3,4-tris(3-hydroxypropyl)imidazolium cation, 1,3,4-tris(4-hydroxybutyl)imidazolium cation, 1,3,4-tris(6-hydroxyhexyl)imidazolium cation, and 1,3,4-tris(8-hydroxyoctyl)imidazolium cation; and derivatives thereof.

Examples of the cations having the amino group include cations having a structure in which a part or all of the hydroxyl groups possessed by the above cations are substituted with the amino group.

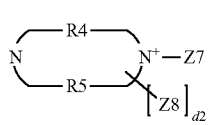

Structural Formula (3)

In the structural formula (3), R4 and R5 each represent a divalent hydrocarbon group necessary for forming a nitrogen-containing heteroaromatic six-membered ring together with a nitrogen atom to which each is bonded. In order to form the heteroaromatic six-membered ring together with the two nitrogen atoms, for example, either one of R4 and R5 can be a hydrocarbon group having 1 carbon atom and the other can be a hydrocarbon group having 3 carbon atoms. Alternatively, both R4 and R5 can be hydrocarbon groups having 2 carbon atoms.

The nitrogen-containing heteroaromatic six-membered ring according to the structural formula (3) can have Z8 as a substituent other than a hydrogen atom. Z8 represents any structure selected from the group consisting of the structures represented by the structural formulae (Z101) and (Z102), or a monovalent hydrocarbon group having 1 to 4 carbon atoms. As the monovalent hydrocarbon group, an alkyl group is preferable. The suffix d2 represents an integer between 0 and 2. When the d2 is 2, Z8 may be the same or different from each other. Z7 represents any structure selected from the group consisting of the structures represented by the structural formulae (Z101) and (Z102), a hydrogen atom, or a monovalent hydrocarbon group having 1 to 4 carbon atoms. As the monovalent hydrocarbon group, an alkyl group is preferable. In addition, at least one of Z7 and Z8 is any structure selected from the group consisting of the structures represented by the structural formulae (Z101) and (Z102). The structure represented by the structural formula (3) is, for example, a structure derived from an ionic compound having a nitrogen-containing heteroaromatic six-membered ring cation which has at least one of a hydroxyl group and an amino group, and contains two nitrogen atoms. In other words, when the ionic compound has at least one hydroxyl group, a crosslinked urethane resin having at least one structure represented by the structural formula (Z101) is obtained by a reaction of the hydroxyl group with an isocyanate group. In addition, when the ionic compound has at least one amino group, a crosslinked urethane resin having at least one structure represented by the structural formula (Z102) is obtained by a reaction of the amino group with the isocyanate group.

Examples of the nitrogen-containing heteroaromatic six-membered ring in the structural formula (3) include a pyrimidine ring and a pyrazine ring.

Specific examples of the structural formula (3) include a structure represented by the following structural formula (3)-1.

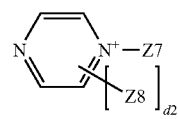

Structural formula (3)-1

In the structural formula (3)-1, the definitions of Z7, Z8 and d2 are synonymous with the same in the structural formula (3).

As for examples of the cation of the ionic compound which can form the structure represented by the structural formula (3), cations having a pyrimidine ring structure and having a hydroxyl group include the following substances: 1,4-bis(2-hydroxyethyl)pyrimidinium cation, 1,5-bis(3-hydroxypropyl)pyrimidinium cation, 1-(4-hydroxybutyl)-4-(2-hydroxyethyl)pyrimidinium cation, and 1,4-bis(2-hydroxyethyl)-2-methylpyrimidinium cation; and derivatives thereof.

Examples of the cations having at least one amino group include cations having a structure in which a part or all of the hydroxyl groups possessed by the above cations are substituted with the amino group.

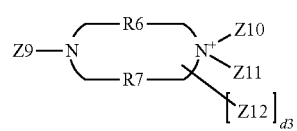

Structural Formula (4)

In the structural formula (4), R6 and R7 each represent a divalent hydrocarbon group necessary for forming a nitrogen-containing heteroalicyclic group together with a nitrogen atom to which each is bonded. Examples of the nitrogen-containing heteroalicyclic group include five- to seven-membered ring structures. Examples of R6 and R7 include an alkylene group having 1 to 3 carbon atoms or an alkenylene group having 2 to 3 carbon atoms, which can form five- to seven-membered ring structures. Among the groups, the alkylene group is preferable.

The nitrogen-containing heteroalicyclic group according to the structural formula (4) can have Z12 as a substituent other than a hydrogen atom. Z12 represents any structure selected from the group consisting of the structures represented by the structural formulae (Z101) and (Z102), or a monovalent hydrocarbon group having 1 to 4 carbon atoms. As the monovalent hydrocarbon group, an alkyl group is preferable. The suffix d3 represents an integer of 0 to 2, and when d3 is 2, Z12 may be the same or different from each other.

In addition, Z9 to Z11 each independently represent any structure selected from the group consisting of the structures represented by the structural formulae (Z101) and (Z102), a hydrogen atom, or a monovalent hydrocarbon group having 1 to 4 carbon atoms. As the monovalent hydrocarbon group, an alkyl group is preferable. Furthermore, at least one of Z9 to Z12 is any structure selected from the group consisting of the structures represented by the structural formulae (Z101) and (Z102). The structure represented by the structural formula (4) is, for example, a structure derived from an ionic compound having a nitrogen-containing heteroalicyclic cation which has at least one of a hydroxyl group and an amino group, and contains two nitrogen atoms. In other words, when the ionic compound has at least one hydroxyl group, a crosslinked urethane resin having at least one structure represented by the structural formula (Z101) is obtained by a reaction of the hydroxyl group with an isocyanate group. In addition, when the ionic compound has at least one amino group, a crosslinked urethane resin having at least one structure represented by the structural formula (Z102) is obtained by a reaction of the amino group with the isocyanate group.

Examples of the nitrogen-containing heteroalicyclic group in the structural formula (4) include a piperazine group (six-membered), an imidazoline group (five-membered), an imidazolidine group (five-membered), a 1,3-diazepane group (seven-membered), and a 1,4-diazepane group (seven-membered).

Specific examples of the structural formula (4) include a structure represented by the following structural formula (4)-1.

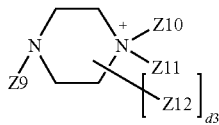

Structural formula (4)-1

In the structural formula (4)-1, the definitions of Z9 to Z11 and d3 are synonymous with the same in the structural formula (4).

As for examples of the cation of the ionic compound which can form the structure represented by the structural formula (4), cations having a piperazine group and having a hydroxyl group include the following substances: 1,1-bis(2-hydroxyethyl)piperazinium cation, 1,1,4-tris(2-hydroxyethyl)piperazinium cation, 1,4-bis(3-hydroxypropyl)-1-ethylpiperazinium cation, and 1,4-bis(2-hydroxyethyl)-1,3-diethylpiperazinium cation; and derivatives thereof.

Examples of the cations having at least one amino group include cations having a structure in which a part or all of the hydroxyl groups in the above cations are substituted with the amino group.

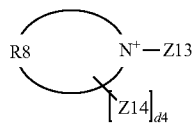

Structural Formula (5)

In the structural formula (5), R8 represents a divalent hydrocarbon group necessary for forming a nitrogen-containing heteroaromatic ring together with a nitrogen atom to which R8 is bonded. The nitrogen-containing heteroaromatic ring is a five- to seven-membered ring, is preferably a five- or six-membered ring, and is more preferably a six-membered ring.

Z13 represents any structure selected from the group consisting of the structures represented by the structural formulae (Z101) and (Z102), a hydrogen atom, or a monovalent hydrocarbon group having 1 to 4 carbon atoms. As the monovalent hydrocarbon group, an alkyl group is preferable.

The nitrogen-containing heteroaromatic ring can have Z14 as a substituent other than hydrogen. Z14 represents any structure selected from the group consisting of the structures represented by the structural formulae (Z101) and (Z102), or a monovalent hydrocarbon group having 1 to 4 carbon atoms. As the monovalent hydrocarbon group, an alkyl group is preferable. The suffix d4 represents an integer of 0 or 1.

At least one of Z13 and Z14 is any structure selected from the group consisting of the structures represented by the structural formulae (Z101) and (Z102).

The structure represented by the structural formula (5) is, for example, a structure derived from an ionic compound having a nitrogen-containing aromatic cation which has at least one of a hydroxyl group and an amino group, and contains one nitrogen atom. When the cation of the ionic compound has at least one hydroxyl group, a crosslinked urethane resin having at least one structure represented by the structural formula (Z101) is obtained by a reaction of the hydroxyl group with an isocyanate group. In addition, when the cation of the ionic compound has at least one amino group, a crosslinked urethane resin having at least one structure represented by the structural formula (Z102) is obtained by a reaction of the amino group with the isocyanate group.

Examples of the nitrogen-containing aromatic ring in the structural formula (5) include a pyrrole ring, a pyridine ring, and an azepine ring.

Specific examples of the structural formula (5) include a structure represented by the following structural formula (5)-1.

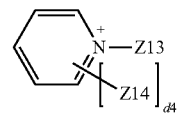

Structural formula (5)-1

In the structural formula (5)-1, the definitions of Z13, Z14 and d4 are synonymous with the same in the structural formula (5).

As for examples of the cation of the ionic compound which can form the structure represented by the structural formula (5), cations having a pyridine ring structure and having a hydroxyl group include the following substances: 1-hydroxymethylpyridinium cation, 1-(2-hydroxyethyl)pyridinium cation, 1-(3-hydroxypropyl)pyridinium cation, 1-(4-hydroxybutyl)pyridinium cation, 1-(6-hydroxyhexyl)pyridinium cation, 1-(8-hydroxyoctyl)pyridinium cation, 2-methyl-1-(2-hydroxyethyl)pyridinium cation, 3-methyl-1-(2-hydroxyethyl)pyridinium cation, 4-methyl-1-(2-hydroxyethyl)pyridinium cation, 3-ethyl-1-(2-hydroxyethyl)pyridinium cation, 3-n-butyl-1-(2-hydroxyethyl)pyridinium cation, 1-methyl-2-hydroxymethylpyridinium cation, 1-methyl-3-hydroxymethylpyridinium cation, 1-methyl-4-hydroxymethylpyridinium cation, 1-methyl-2-(2-hydroxyethyl)pyridinium cation, 1-methyl-3-(2-hydroxyethyl)pyridinium cation, 1-methyl-4-(2-hydroxyethyl)pyridinium cation, 1-ethyl-3-(2-hydroxyethyl)pyridinium cation, 1-n-butyl-3-(2-hydroxyethyl)pyridinium cation, and 2-methyl-4-n-butyl-1-(2-hydroxyethyl)pyridinium cation;
1,2-bishydroxymethylpyridinium cation, 1,3-bishydroxymethylpyridinium cation, 1,4-bishydroxymethylpyridinium cation, 1,2-bis(2-hydroxyethyl)pyridinium cation, 1,3-bis(2-hydroxyethyl)pyridinium cation, 1,4-bis(2-hydroxyethyl)pyridinium cation, 1,2-bis(3-hydroxypropyl)pyridinium cation, 1,3-bis(3-hydroxypropyl)pyridinium cation, 1,4-bis(3-hydroxypropyl)pyridinium cation, 1,2-bis(4-hydroxybutyl)pyridinium cation, 1,3-bis(4-hydroxybutyl)pyridinium cation, 1,4-bis(4-hydroxybutyl)pyridinium cation, 1,2-bis(6-hydroxyhexyl)pyridinium cation, 1,3-bis(6-hydroxyhexyl)pyridinium cation, 1,4-bis(6-hydroxyhexyl)pyridinium cation, 1,2-bis(8-hydroxyoctyl)pyridinium cation, 1,3-bis(8-hydroxyoctyl)pyridinium cation, 1,4-bis(8-hydroxyoctyl)pyridinium cation, 2-methyl-1,3-bis(2-hydroxyethyl)pyridinium cation, 2-ethyl-1,3-bis(2-hydroxyethyl)pyridinium cation, 5-methyl-1,3-bis(2-hydroxyethyl)pyridinium cation, and 5-ethyl-1,3-bis(2-hydroxyethyl)pyridinium cation;
1,2,4-trishydroxymethylpyridinium cation, 1,2,4-tris(2-hydroxyethyl)pyridinium cation, 1,2,4-tris(3-hydroxypropyl)pyridinium cation, 1,2,4-tris(4-hydroxybutyl)pyridinium cation, 1,2,4-tris(6-hydroxyhexyl)pyridinium cation, 1,2,4-tris(8-hydroxyoctyl)pyridinium cation, 1,3,5-trishydroxymethylpyridinium cation, 1,3,5-tris(2-hydroxyethyl)pyridinium cation, 1,3,5-tris(3-hydroxypropyl)pyridinium cation, 1,3,5-tris(4-hydroxybutyl)pyridinium cation, 1,3,5-tris(6-hydroxyhexyl)pyridinium cation, and 1,3,5-tris(8-hydroxyoctyl)pyridinium cation; and derivatives thereof.

Examples of the cations having at least one amino group include cations having a structure in which a part or all of the hydroxyl groups possessed by the above cations are substituted with the amino group.

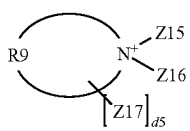

Structural Formula (6)

In the structural formula (6), R9 represents a divalent hydrocarbon group necessary for forming a nitrogen-containing alicyclic group together with a nitrogen atom to which R9 is bonded. Examples of the nitrogen-containing alicyclic group include a five- to eight-membered ring structure.

Examples of R9 include an alkylene group having 4 to 7 carbon atoms, or an alkenylene group having 4 to 7 carbon atoms, but the alkylene group is preferable.

The nitrogen-containing alicyclic group can have Z17 as a substituent other than a hydrogen atom. Z17 represents any structure selected from the group consisting of the structures represented by the structural formulae (Z101) and (Z102), or a monovalent hydrocarbon group having 1 to 4 carbon atoms. As the monovalent hydrocarbon group, an alkyl group is preferable. The suffix d5 represents an integer of 0 or 1.

Z15 and Z16 each independently represent any structure selected from the group consisting of the structures represented by the structural formulae (Z101) and (Z102), a hydrogen atom, or a monovalent hydrocarbon group having 1 to 4 carbon atoms. As the monovalent hydrocarbon group, an alkyl group is preferable. In addition, at least one of Z15 to Z17 is any structure selected from the group consisting of the structures represented by the structural formulae (Z101) and (Z102).

The structure represented by the structural formula (6) is a structure derived from an ionic compound having a nitrogen-containing alicyclic cation which has at least one of a hydroxyl group and an amino group, and contains one nitrogen atom.

When the cation of the ionic compound has at least one hydroxyl group, a crosslinked urethane resin having at least one structure represented by the structural formula (Z101) is obtained by a reaction of the hydroxyl group with an isocyanate group. In addition, when the cation of the ionic compound has at least one amino group, a crosslinked urethane resin having at least one structure represented by the structural formula (Z102) is obtained by a reaction of the amino group with the isocyanate group.

Examples of the nitrogen-containing alicyclic group in the structural formula (6) include a pyrrolidine group (five-membered), a pyrroline group (five-membered), a piperidine group (six-membered), an azepane group (seven-membered), and an azocane group (eight-membered).

Specific examples of the structural formula (6) include a structure represented by the following structural formula (6)-1.

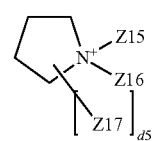

Structural formula (6)-1

In the structural formula (6)-1, the definitions of Z15 to Z17 and d5 are synonymous with the same in the structural formula (6).

As for examples of the cation of the ionic compound which can form the structure represented by the structural formula (6), cations having a pyrrolidine group and having a hydroxyl group include the following substances: 1-methyl-1,2-bis(2-hydroxyethyl)pyrrolidinium cation, 1-ethyl-1,2-bis(2-hydroxyethyl)pyrrolidinium cation, 1-butyl-1,2-bis(2-hydroxyethyl)pyrrolidinium cation, and 1-methyl-1,2-bis(4-hydroxybutyl)pyrrolidinium cation; and derivatives thereof.

Examples of the cations having the amino group include cations having a structure in which a part or all of the hydroxyl groups possessed by the above cations are substituted with the amino group.

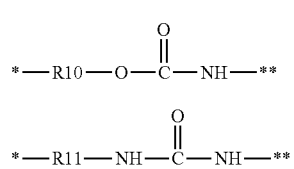

Structural Formula (Z101)

Structural Formula (Z102)

In the structural formulae (Z101) and (Z102), R10 and R11 each independently represent a divalent hydrocarbon group having a straight chain or a branch. It is preferable that the hydrocarbon group is an alkylene group having a straight chain or a branch and having 1 to 8 carbon atoms.

The symbol "*" represents a bonding site for bonding to a nitrogen atom in the structural formula (1), or a bonding site for bonding to a nitrogen atom in a nitrogen-containing heterocyclic ring or a carbon atom in the nitrogen-containing heterocyclic ring in the structural formulae (2) to (6). The symbol "**" represents a bonding site for bonding to a carbon atom in a polymer chain constituting the resin having a cationic structure.

The structure represented by the structural formula (Z101) is a residual group which is formed by a reaction of the hydroxyl group possessed by the cation of the ionic compound to become a raw material, with the isocyanate group, as previously described.

The structure represented by the structural formula (Z102) is a residual group which is formed by a reaction of an amino group possessed by a cation with the isocyanate group. The isocyanate group that reacts with the hydroxyl group or the amino group is preferably the isocyanate group possessed by the binder resin.

The resin layer according to one aspect of the present disclosure may contain carbon black together with a resin having the cation structure. In the case where the resin layer contains carbon black, the cation structure in the resin is preferably a cation structure having an aromatic ring as in the above structural formulae (2) to (3) and (5). The reason is because a π electron on the aromatic ring and a π electron possessed by carbon black interact with each other, and the molecular mobility of the cationic structure site can be further suppressed.

[Crosslinked Acrylic Resin]

The crosslinked acrylic resin is formed by polymerization of an acrylic monomer having an ether bond (—C—O—C—). The acrylic monomer referred to herein means not only an acrylic monomer but also a methacrylic monomer. Specifically, the crosslinked acrylic resin is formed by polymerization of either or both of the acrylic monomer and the methacrylic monomer.

The ether bond in the acrylic monomer is a —C—O—C— bond other than the ester moiety, and is usually introduced as a polyoxyalkylene structure. Examples of the polyoxyalkylene structure include ethylene oxide (EO) and propylene oxide (PO).

In order that the crosslinked acrylic resin forms the IPN structure together with the crosslinked urethane resin in the extreme vicinity of the outer surface of the surface layer, as previously described, the IPN structure is formed by impregnating a resin layer containing a crosslinked urethane with a liquid acrylic monomer, and curing the resultant. The type of acrylic monomer to be used here includes a multifunctional monomer having a plurality of acryloyl groups or methacryloyl groups as functional groups, in order to form the crosslinked structure. On the other hand, when the number of functional groups becomes 4 or more, the viscosity of the acrylic monomer becomes significantly high, and accordingly the acrylic monomer is difficult to penetrate into the surface of the resin layer formed of the crosslinked urethane resin, and as a result, the IPN structure resists being formed. Accordingly, the acrylic monomer is preferably a monomer in which the total number of acryloyl groups and methacryloyl groups contained in one molecule is two or three, and is more preferably a bifunctional acrylic monomer in which the total number is two. When these multifunctional monomers are used, the IPN structure is effectively formed, and accordingly, the molecular mobility of the crosslinked urethane resin can be effectively suppressed. In addition, a monofunctional monomer may also be combined as needed.

It is preferable that a molecular weight of the above acrylic monomer is in a range of 200 or larger and 750 or smaller. By using the molecular weight in this range, it is easy to form the IPN structure with respect to the network structure of the crosslinked urethane resin, and the molecular mobility of the crosslinked urethane resin can be further suppressed. As previously described, the acrylic monomer is impregnated into the resin layer containing the crosslinked urethane resin. For this purpose, the viscosity of the acrylic monomer is preferably 5.0 mPa·s or higher and 140 mPa·s or lower at 25° C.

In other words, one type or two or more types of acrylic monomers satisfying the above ranges of the molecular weight and viscosity are selected, are impregnated into the resin layer, and are polymerized; and thereby the IPN structure of the crosslinked urethane resin and the crosslinked acrylic resin can be formed.

A method for polymerizing the acrylic monomer is not particularly limited, and known methods can be used. Specific examples thereof include methods such as heating and ultraviolet irradiation.

For each of the polymerization methods, a known radical polymerization initiator or ion polymerization initiator can be used.

Examples of the polymerization initiator in the case of polymerization by heating include: peroxides such as 3-hydroxy-1,1-dimethylbutyl peroxyneodecanoate, α-cumyl peroxyneodecanoate, t-butyl peroxyneoheptanoate, t-butyl peroxybivalate, t-amyl peroxy normal octoate, t-butylperoxy 2-ethylhexyl carbonate, dicumyl peroxide, di-t-butyl peroxide, di-t-amyl peroxide, 1,1-di(t-butylperoxy)cyclohexane, and n-butyl-4,4-di(t-butylperoxy) valerate; and azo compounds such as 2,2-azobisbutyronitrile, 2,2-azobis(4-methoxy-2,4-dimethylvaleronitrile), 2,2-azobis(2,4-dimethylvaleronitrile), 2,2-azobis(2-methylbutyronitrile), 1,1-azobis(cyclohexane-1-carbonitrile), 2,2-azobis[2-(2-imidazolin-2-yl) propane], 2,2-azobis[2-methyl-N-(2-hydroxyethyl) propionamide], 2,2-azobis[N-(2-propenyl)-2-methylpropionamide], 2,2-azobis(N-butyl-2-methoxypropionamide), and dimethyl-2,2-azobis (isobutyrate).

Examples of the polymerization initiator in the case of polymerization by irradiation with ultraviolet rays include: 2,2-dimethoxy-1,2-diphenylethan-1-one, 1-hydroxycyclohexyl phenyl ketone, 2-hydroxy-2-methyl-1-phenylpropan-1-one, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]-phenyl}-2-methylpropan-1-one, 2-methyl-1-[4-(methylthio)phenyl]-2-morpholinopropan-1-one, 2-benzyl-2-dimethylamino-1-(4-morpholinophenyl)-butan-1-one, 2-dimethylamino-2-(4-methylbenzyl)-1-(4-morpholin-4-yl-phenyl)-butan-1-one, bis(2,4,6-trimethylbenzoyl)-phenylphosphine oxide, and 2,4,6-trimethylbenzoyl-diphenylphosphine oxide.

For information, these polymerization initiators may be used alone or in combination of two or more types thereof.

In addition, it is preferable that the polymerization initiator is used in a blending amount of 0.5 parts by mass or more and 10 parts by mass or less, when a total amount of a chemical compound for forming a specific resin (for example, chemical compound having (meth)acryloyl group) is determined to be 100 parts by mass, from the viewpoint of efficiently proceeding the reaction.

For information, as a heating apparatus and an ultraviolet irradiation apparatus, known apparatuses can be appropriately used. Examples of a usable light source for emitting ultraviolet rays include an LED lamp, a high-pressure mercury lamp, a metal halide lamp, a xenon lamp, and a low-pressure mercury lamp. A cumulative amount of light required for the polymerization can be appropriately adjusted according to the types and amounts of the chemical compound and polymerization initiator to be used.

Examples of the acrylic monomers include: bifunctional (meth)acrylates such as diethylene glycol di(meth)acrylate, dipropylene glycol di(meth)acrylate, triethylene glycol di(meth)acrylate, tripropylene glycol di(meth)acrylate, PO-modified neopentyl glycol di(meth)acrylate, and polyethylene glycol di(meth)acrylate; and trifunctional (meth)acrylates such as trimethylolpropane ethoxy tri(meth)acrylate, and glycerol propoxy tri(meth)acrylate.

[Crosslinked Epoxy Resin]

The crosslinked epoxy resin is formed by polymerization of, for example, a glycidyl ether monomer having an ether bond (—C—O—C—), and has a structural unit represented by the following structural formula (7).

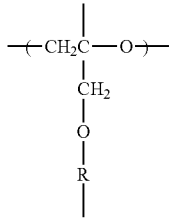

Structural Formula (7)

(In the structural formula (7), R represents a divalent hydrocarbon having a straight chain or a branched chain.)

In order that the crosslinked epoxy resin forms the IPN structure with the crosslinked urethane resin in the extreme vicinity of the outer surface of the surface layer, there is a method of impregnating the resin layer containing the crosslinked urethane with a liquid glycidyl ether monomer, and curing the resultant glycidyl ether monomer, as previously described.

The type of glycidyl ether monomer to be used here includes a multifunctional monomer having a plurality of glycidyl groups, in order to form the crosslinked structure. On the other hand, when the number of functional groups becomes 4 or more, the viscosity of the glycidyl ether monomer becomes significantly high, and accordingly it is difficult for the glycidyl ether monomer to penetrate into the surface of the resin layer formed of the crosslinked urethane resin, and as a result, the IPN structure resists being formed. Accordingly, the glycidyl ether monomer is preferably a monomer in which glycidyl groups contained in one molecule are two or three, and is more preferably a bifunctional glycidyl ether monomer in which the glycidyl groups are two. When these multifunctional monomers are used, the IPN structure is effectively formed, and accordingly, the molecular mobility of the crosslinked urethane resin can be effectively suppressed. In addition, a monofunctional monomer may also be combined as needed.

It is preferable that a molecular weight of the above glycidyl ether monomer is in a range of 200 or larger and 750 or smaller. By using the molecular weight in this range, the IPN structure is easily formed with respect to the network structure of the crosslinked urethane resin, and the molecular mobility of the crosslinked urethane resin can be further suppressed.

As previously described, the glycidyl ether monomer is impregnated into the resin layer containing the crosslinked urethane resin. For this purpose, the glycidyl ether monomer has a suitable viscosity. In other words, the glycidyl ether monomer with high viscosity resists being impregnated, and it is difficult for the glycidyl ether monomer with low viscosity to control the impregnation state. Accordingly, the viscosity of the glycidyl ether monomer is preferably 5.0 mPa·s or higher and 140 mPa·s or lower at 25° C.

In other words, one type or two or more types of glycidyl ether monomers satisfying the above ranges of the molecular weight and viscosity are selected, are impregnated into the resin layer, and are polymerized; and thereby the IPN structure of the crosslinked urethane resin and the crosslinked epoxy resin can be formed.

A method for polymerizing the glycidyl ether monomer is not particularly limited, and known methods can be used.

As a heating apparatus and an ultraviolet irradiation apparatus, known apparatuses can be appropriately used, as in the case of the acrylic monomer. Examples of a usable light source for emitting ultraviolet rays include an LED lamp, a high-pressure mercury lamp, a metal halide lamp, a xenon lamp, and a low-pressure mercury lamp. The cumulative amount of light required for the polymerization can be appropriately adjusted according to the types and amounts of the chemical compound and polymerization initiator to be used.

As the glycidyl ether monomer, alkyleneoxy glycidyl ether is preferably used. Specific examples include the following substances: ethylene glycol diglycidyl ether, propylene glycol diglycidyl ether, 1,4-butanediol diglycidyl ether, 1,5-pentadiol diglycidyl ether, and neopentyl glycol diglycidyl ether, and 1,6-hexanediol diglycidyl ether.

<Method for Confirming Interpenetrating Polymer Network Structure (IPN)>

Methods for confirming that the IPN structure is formed include a method by solvent extraction, and a method of confirming by a shift of the glass transition point before and after the IPN structure is formed; but in the present disclosure, confirmation is made from a peak top temperature of a thermal chromatogram.

Due to the mutual entanglement of the polymers, the thermal decomposition temperature, specifically, the peak top temperature in the thermal chromatogram shifts to a high temperature side. Accordingly, the presence or absence of the IPN structure can be confirmed by confirming a magnitude relation between the peak top temperatures in the thermal chromatograms in the presence or absence of the formation of the IPN structure. Specifically, when the peak top of the crosslinked acrylic resin or crosslinked epoxy resin which forms the IPN structure together with the crosslinked urethane resin is compared with that of the crosslinked acrylic resin or epoxy resin in the case where the resin exists alone, the peak top temperature of the former results in existing in a higher temperature side. Accordingly, when the peak top temperatures in the thermal chromatograms derived from the second resin are compared before and after the crosslinked urethane resin is decomposed and removed, in the case where the peak top temperature is higher before the crosslinked urethane resin is decomposed and removed, it can be confirmed that an IPN structure is formed.

The thermal chromatogram referred to herein means a mass spectrum which can be obtained by a microsampling mass spectrometry and is called an ion chromatogram. A summary of the microsampling mass spectrometry will be described below.

<Microsampling Mass Spectrometry>

Figure 5:
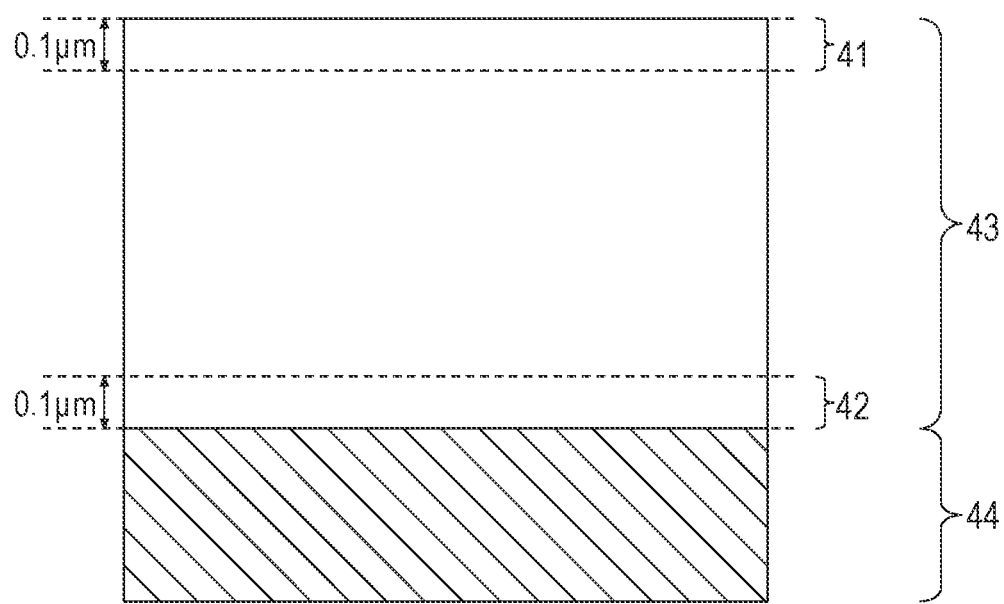
FIG. 5 is a schematic view illustrating one example of a cross section of a developing member according to the present disclosure.

Firstly, an area to be measured of the electrophotographic member is cut into a thin piece with the use of a cryomicrotome, and a sample is prepared. In the present disclosure, as is illustrated in FIG. 5, a sample is prepared from two areas, referred to as a first area 41 and a second area 42. The first area is an area from the outer surface of the surface layer 43 to a depth of 0.1 µm, and the second area is an area that is 0.1 µm thick from the back surface (surface facing electro-conductive substrate 44) of the surface layer 43 toward the outer surface. A sample of 100 µm square having a width of 0.1 µm in the depth direction is prepared from each of the areas of the surface layer. For the measurement, an ion trap type mass spectrometer mounted on a gas chromatography mass spectrometer ("PolarisQ" (trade name, manufactured by Thermo Electron Corporation)) is used, for example. The sample is fixed to a filament located at the tip of a probe, and is inserted directly into an ionization chamber. After that, the sample is rapidly heated from room temperature to a temperature of 1000° C. at a constant heating rate. The sample which has been decomposed and evaporated by heating is ionized by irradiation with the electron beam, and is detected by a mass spectrometer. At this time, under the condition that the heating rate is constant, a thermal chromatogram is obtained which is called as a total ion chromatogram (TIC), has a mass spectrum, and is similar to a TG-MS (heat weight-mass spectrometry) method. In addition, a thermal chromatogram for a fragment having a predetermined mass can be also obtained, and accordingly a peak temperature of the thermal chromatogram corresponding to a decomposition temperature of a desired molecular structure can be obtained. The peak temperature of the thermal chromatogram correlates with the crosslinked structure in the structure of the resin, and as the crosslinking becomes denser, the peak temperature results in shifting to a higher temperature side.

In the electrophotographic member according to the present embodiment, the first resin and the second resin form the IPN structure in the extreme vicinity of the outer surface of the surface layer, and thereby both resins are held at a close position even in a high-temperature environment. Thereby, the interaction of the intermolecular force between the first resin and the second resin can be exhibited even in a high-temperature environment, and accordingly, the leakage of the electric charge of the toner particle is suppressed even in a high-temperature and high-humidity environment.

The fact that the second resin forms the IPN structure with respect to the first resin may be confirmed by confirming that there is a difference in the peak temperature of the thermal chromatogram of the fragment derived from the second resin, between the times before and after the first resin in the composition is decomposed and removed. Specifically, the peak top temperature of the thermal chromatogram derived from the crosslinked acrylic resin or epoxy resin is determined as A1 (° C.), which is measured from the first sample sampled from the previously described first area. In addition, the peak top temperature of the thermal chromatogram derived from the crosslinked acrylic resin or the crosslinked epoxy resin is determined as A2 (° C.), which is measured from the second sample which is obtained by the decomposition of the crosslinked urethane resin contained in the first sample. When the A1 and the A2 satisfy the relationship represented by the following relational formula (1), the molecular mobility of the cation structure portion on the outer surface of the surface layer is effectively suppressed, and the transfer of electric charges from the toner particles can be suppressed.

$$A1 > A2 \quad (1)$$

In addition, T1 represents the peak top temperature (° C.) of the thermal chromatogram derived from the crosslinked urethane resin in the first area, and T2 represents the peak top temperature (° C.) of the thermal chromatogram derived from the crosslinked urethane resin contained in the second area. At this time, it is preferable that the following relational expression (2) is satisfied.

$$T1 > T2 \quad (2)$$

Not satisfying the relational expression (2) means that the molecular mobility of the crosslinked urethane resin is suppressed not only in the outer surface of the surface layer but also in the whole surface layer. When the expression (2) is not satisfied, the electrophotographic member tends to cause charge up also at high temperature and high humidity, which is disadvantageous to fogging.

[Anion]

Examples of the anion include: a fluorinated sulfonate anion, a fluorinated carboxylate anion, a sulfonyl fluoride imide anion, a sulfonyl fluoride methide anion, a fluorinated alkyl fluoroborate anion, a fluorinated alkyl fluorophosphate anion, a halide ion, a carboxylate anion, a sulfonate anion, tetrafluoroborate anion, hexafluorophosphate anion, hexafluoroarsenate anion, hexafluoroantimonate anion, dicyanamide anion, bis(oxalato)borate anion, nitrate anion and perchlorate anion.

Examples of the fluorinated sulfonate anion include trifluoromethanesulfonate anion, fluoromethanesulfonate anion, perfluoroethyl sulfonate anion, perfluoropropyl sulfonate anion, perfluorobutyl sulfonate anion, perfluoropentyl sulfonate anion, perfluorohexyl sulfonate anion, and perfluorooctyl sulfonate anion.

Examples of the fluorinated carboxylate anion include trifluoroacetate anion, perfluoropropionate anion, perfluorobutyrate anion, perfluorovalerate anion, and perfluorocaproate anion.

Examples of the fluorinated sulfonylimide anion include anions such as trifluoromethanesulfonylimide anion, perfluoroethylsulfonylimide anion, perfluoropropylsulfonylimide anion, perfluorobutylsulfonylimide anion, perfluoropentylsulfonylimide anion, perfluorohexylsulfonylimide anion, perfluorooctylsulfonylimide anion, and fluorosulfonylimide anion; and cyclic anions such as cyclo-hexafluoropropane-1,3-bis(sulfonyl)imide.

Examples of the sulfonyl fluoride methide anion include trifluoromethanesulfonylmethide anion, perfluoroethylsulfonylmethide anion, perfluoropropylsulfonylmethide anion, perfluorobutylsulfonylmethide anion, perfluoropentylsulfonylmethide anion, perfluorohexylsulfonylmethide anion, and perfluorooctylsulfonylmethide anion.

Examples of the fluorinated alkyl fluoroborate anion include trifluoromethyltrifluoroborate anion, and perfluoroethyltrifluoroborate anion.

Examples of the fluorinated alkyl fluorophosphate anion include tris-trifluoromethyl-trifluorophosphate anion and tris-perfluoroethyl-trifluorophosphate anion.

Examples of the halide ion include a fluoride ion, a chloride ion, a bromide ion, and an iodide ion.

Examples of the carboxylate anion include: alkyl carboxylate anions such as acetate anion, propionate anion, butyrate anion, and hexanoate anion; and aromatic carboxylate anions such as benzoate anion. The anions may have one or more substituents such as: hydrocarbon groups having 1 to 30 carbon atoms; halogen groups such as fluorine, chlorine, bromine and iodine; alkoxy groups such as a methoxy group and an ethoxy group; substituents containing a hetero atom such as an amide group and a cyano group; and haloalkyl groups such as a trifluoromethyl group.

Examples of the sulfonate anion include alkyl sulfonate anions such as methanesulfonate anion and ethanesulfonate anion, and aromatic sulfonate anions such as benzenesulfonate and para-toluenesulfonate anions; and may be substituted with one or more substituents such as hydrocarbon groups having 1 to 30 carbon atoms, halogen groups such as fluorine, chlorine, bromine and iodine, alkoxy groups such as a methoxy group and an ethoxy group, substituents containing a hetero atom such as an amide group or a cyano group, and haloalkyl groups such as a trifluoromethyl group.

[Electro-Conductivity Imparting Agent]

In the surface layer, in addition to the ion conductive structure due to the cation and the anion in the resin, an electro-conductivity imparting agent such as an electron conductive substance or another ionic compound may be blended to such an extent that the effect exhibited by the constitution according to the present disclosure is not impaired. The volume resistivity of the surface layer is adjusted to preferably $10^3$ Ωcm or higher and $10^{11}$ Ωcm or lower, and is more preferably to $10^4$ Ωcm or higher and $10^{10}$ Ωcm or lower.

As the electron conductive substance, an electro-conductive filler which will be described later can be used, but electro-conductive carbon is preferable because it is easy to control the electro-conductivity with a small amount.

These electro-conductivity imparting agents are used in an amount necessary for adjusting the surface layer to an appropriate volume resistivity as described above, and are generally used in a range of 0.5 parts by mass or more and 50 parts by mass or less, with respect to 100 parts by mass of a binder resin.

[Filler]

In addition, the surface layer may contain a filler for the purpose of enhancing its reinforcing effect.

Examples of the insulating filler include the following substances: a fine quartz powder, a silica particle, diatomaceous earth, zinc oxide, basic magnesium carbonate, activated calcium carbonate, magnesium silicate, aluminum silicate, titanium dioxide, talc, a mica powder, aluminum sulfate, calcium sulfate, barium sulfate, a glass fiber, an organic reinforcing agent and an organic filler. The surfaces of these fillers may be hydrophobized by treatment with an organosilicon compound, for example, a polydiorganosiloxane. As the insulating filler, the silica particle is preferably used, because the uniform dispersibility in the surface layer is adequate. Furthermore, among the silica particles, a silica particle of which the surface is subjected to hydrophobic treatment is particularly preferably used. A content of the silica particle is preferably 0.5% by mass or more and 20% by mass or less, with respect to 100 parts by mass of the resin component which forms the surface layer.

In consideration of a reinforcing performance and electro-conductivity of the surface layer, a primary particle size of the silica particles is preferably in a range of 10 nm or larger and 120 nm or smaller, by a number average primary particle size. In addition, it is more preferably to be in a range of 15 nm or larger and 80 nm or smaller, and is particularly preferably to be in a range of 15 nm or larger and 40 nm or smaller. For information, the number average primary particle size is measured in the following way. The silica particles are observed by a scanning electron microscope, the particle sizes of 100 particles in a visual field are measured, and the average particle size is obtained.

Examples of the electro-conductive filler include the following substances: carbon-based substances such as carbon black and graphite; metals or alloys such as aluminum, silver, gold, a tin-lead alloy, and a copper-nickel alloy; metal oxides such as zinc oxide, titanium oxide, aluminum oxide, tin oxide, antimony oxide, indium oxide and silver oxide; and substances in which various fillers are plated with electro-conductive metals such as copper, nickel and silver. As the electro-conductive filler, carbon black is particularly preferably used, because it is easy to control the electro-conductivity, and because of being inexpensive. Among these, those having a relatively small primary particle size and maintaining hydrophobic tendency are particularly preferably used because the uniform dispersibility in the surface layer is adequate. In consideration of a reinforcing performance and electro-conductivity of the surface layer, a primary particle size of the carbon black is preferably in a range of 20 nm or larger and 60 nm or smaller, by the number average primary particle size. As for the surface characteristics of the carbon black, carbon black having a pH of 3.0 or higher and 8.0 or lower is preferable. In addition, a content of the carbon black is preferably 5% by mass or more and 45% by mass or less, with respect to 100 parts by mass of the resin component which forms the surface layer.

Furthermore, when the elastic layer according to the present embodiment contains carbon black, the carbon black to be used preferably has a volatile content of 0.4% or more, and more preferably has a volatile content of 0.6% or more. The volatile content of the carbon black is measured according to the provisions of Japanese Industrial Standard (JIS) K6221 (1982) "Carbon black test method for rubber".

The volatile content of the carbon black is a parameter that correlates with the amount of functional groups existing on the surface of the carbon black. The greater the volatile content is, the greater the amount of functional groups existing on the surface of the carbon black is. Examples of the surface functional group of the carbon black usually include a carboxyl group and a hydroxyl group. Accordingly, the higher the volatile content of the carbon black is, in other words, the more the surface functional groups are, the higher the acidity of the carbon black is.

The crosslinked urethane resin has a soft segment and a hard segment; and the soft segment is based on a main chain skeleton of a polyol which is a raw material, and the hard segment is an agglomerate of urethane bonds in the molecule through hydrogen bonds. In other words, in the crosslinked urethane resin, a relatively large number of urethane bonds exist in the hard segment.

It is preferable that the coating material for forming the resin layer to be the surface layer contains polyols and polyisocyanates which are the raw materials for the crosslinked urethane resin, and carbon black having a volatile content of 0.4% or more. When the resin layer is formed with the use of such a coating material, the carbon black forms a hydrogen bond with the urethane bond, along with the formation of the crosslinked urethane resin. As a result, the molecular mobility of the urethane structural portion can be suppressed at a high level.

The carbon black with the volatile content of 0.4% or more is commercially available; and includes, for example, "SUNBLACK" (registered trademark) (produced by Asahi Carbon Co., Ltd.), which is carbon black for color, and "Mitsubishi" (registered trademark) carbon black (produced by Mitsubishi Chemical Corporation).

[Other Components]

In addition to the components described so far, the surface layer may contain various additives such as a crosslinking agent, a crosslinking aid, a plasticizer, a filler, an extender, a vulcanizing agent, a vulcanization aid, an antioxidant, an anti-aging agent, a processing aid, a dispersant and a leveling agent, to the extent that the above functions are not impaired.

[Electrophotographic Process Cartridge and Electrophotographic Image Forming Apparatus]

Figure 3:
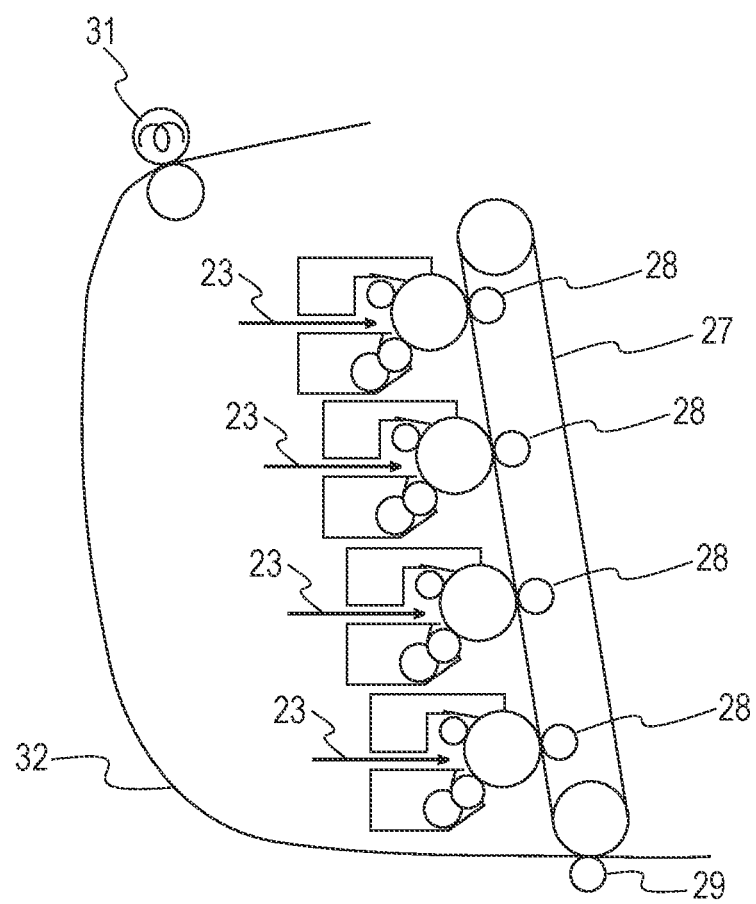
FIG. 3 is a schematic configuration diagram illustrating one example of an electrophotographic image forming apparatus according to the present disclosure.

An electrophotographic image forming apparatus according to the present disclosure includes: an image carrier that carries an electrostatic latent image thereon; a charging apparatus that primarily charges the image carrier; an exposure apparatus that forms the electrostatic latent image on the image carrier that is primarily charged; a developing apparatus that develops the electrostatic latent image with toner to form a toner image; and a transfer apparatus that transfers the toner image to a transfer material. FIG. 3 is a cross-sectional view illustrating an outline of the electrophotographic image forming apparatus according to the present disclosure.

Figure 4:
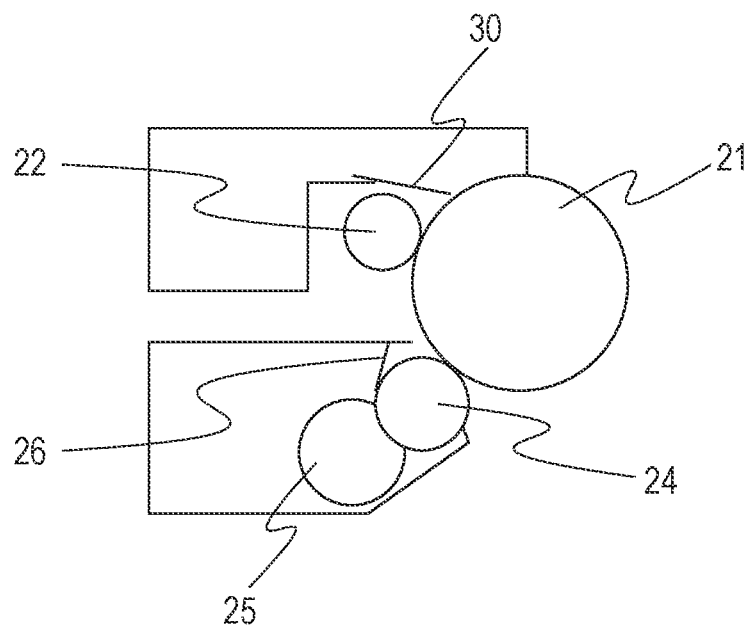
FIG. 4 is a schematic configuration diagram illustrating one example of a process cartridge according to the present disclosure.

FIG. 4 is an enlarged cross-sectional view of the process cartridge which is attached to the electrophotographic image forming apparatus of FIG. 3. The process cartridge contains an image carrier 21 such as a photosensitive drum, the charging apparatus including a charging member 22, the developing apparatus including a developing member 24, and a cleaning apparatus including a cleaning member 30. In addition, the process cartridge is configured to be detachably attachable to the main body of the electrophotographic image forming apparatus of FIG. 3.

The image carrier 21 is uniformly charged (primarily charged) by the charging member 22 which is connected to a bias power source (now shown). A charging potential of the image carrier 21 at this time is −800V or higher and −400V or lower. Next, the image carrier 21 is irradiated with exposure light 23 for writing the electrostatic latent image by an exposure apparatus (not shown), and the electrostatic latent image is formed on the surface. As the exposure light 23, any of LED light and laser light can be used. A surface potential of the image carrier 21 of the exposed portion is −200V or higher and −100V or lower.

Next, the developing member 24 gives (develops) a negatively charged toner to the latent electrostatic image, forms the toner image on the image carrier 21, and converts the latent electrostatic image into a visible image. At this time, a voltage of −500 V or higher and −300 V or lower is applied to the developing member 24 by a bias power source (not shown). For information, the developing member 24 is in contact with the image carrier 21 with a nip width of 0.5 mm or larger and 3 mm or smaller. In the process cartridge according to the present disclosure, a toner supply roller 25 is brought into contact with the developing member 24 in a rotatable state, on the upstream side of the rotation of the developing member 24 with respect to the abutting portion between the developing blade 26 which is a toner regulating member, and the developing member 24.

The toner image developed on the image carrier 21 is primarily transferred to an intermediate transfer belt 27. A primary transfer member 28 abuts on the back surface of the intermediate transfer belt 27, and a voltage of +100 V or higher and +1500 V or lower is applied to the primary transfer member 28; and thereby the toner image having a negative polarity is primarily transferred from the image carrier 21 to the intermediate transfer belt 27. The primary transfer member 28 may have a roller shape or a blade shape.

When the electrophotographic image forming apparatus is a full-color image forming apparatus, each step of the above charging, exposure, development and primary transfer are performed for each color of a yellow color, a cyan color, a magenta color and a black color. For this purpose, in the electrophotographic image forming apparatus illustrated in FIG. 3, four process cartridges in total, which incorporate the toners of the above respective colors, are detachably attached to the electrophotographic image forming apparatus body, one by one. In addition, each step of the above charging, exposure, development and primary transfer is sequentially performed with a predetermined time difference, and a state in which four color toner images for expressing a full-color image are superimposed is created on the intermediate transfer belt 27.

The toner image on the intermediate transfer belt 27 is conveyed to a position facing a secondary transfer member 29, along with the rotation of the intermediate transfer belt 27. Between the intermediate transfer belt 27 and the secondary transfer member 29, a recording sheet is already conveyed along a conveyance route 32 of the recording sheet at a predetermined timing, and the toner image on the intermediate transfer belt 27 is transferred to the recording sheet by a secondary transfer bias applied to the secondary transfer member 29. At this time, the bias voltage applied to the secondary transfer member 29 is +1000 V or higher and +4000 V or lower. The recording sheet on which the toner image is transferred by the secondary transfer member 29 is conveyed to a fixing apparatus 31, the toner image on the recording sheet is melted and fixed onto the recording sheet, then the recording sheet is discharged to the outside of the electrophotographic image forming apparatus, and thereby the printing operation ends.

For information, toner remaining on the image carrier 21 without being transferred from the image carrier 21 to the intermediate transfer belt 27 is scraped off by the cleaning member 30 for cleaning the surface of the image carrier 21, and the surface of the image carrier 21 is cleaned.

Example

The present disclosure will be described below in more detail with reference to specific Examples, while using the developing roller as an example. The technical scope of the present disclosure as the electrophotographic member is not limited to these.

Firstly, an ionic compound was synthesized which was a raw material of a resin contained in a resin layer of an electrophotographic member.

<Synthesis of Ionic Compound>

(Ionic Compound I-1)

Bis(2-hydroxyethyl)dimethylammonium chloride (produced by Tokyo Chemical Industry Co., Ltd.) in an amount of 15.0 g was dissolved in 40.0 g of ion-exchanged water. Next, 37.7 g of lithium bis(pentafluoroethanesulfonyl)imide (produced by Kishida Chemical Co., Ltd.) which was dissolved in 60 g of ion-exchanged water was added thereto dropwise over 30 minutes, as an anion exchange reagent (hereinafter referred to as "anion raw material"), and then the mixture was stirred at 30° C. for 2 hours. The obtained reaction solution was subjected to an extraction operation twice with the use of 100.0 g of ethyl acetate. Subsequently, a separated ethyl acetate layer was washed three times with the use of 60 g of ion-exchanged water. Subsequently, ethyl acetate was distilled off under reduced pressure, and an ionic compound I-1 was obtained in which the anion was a bis(pentafluoroethanesulfonyl)imide anion. The ionic compound I-1 was a chemical compound represented by the following formula.

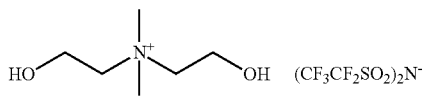

(I-1)

(Ionic Compound I-2)

Diethylenetriamine (produced by Tokyo Chemical Industry Co., Ltd.) in an amount of 15.0 g was dissolved in 35.0 g of tetrahydrofuran. Next, the reaction system was placed under a nitrogen atmosphere, and was ice-cooled. Subsequently, 45.5 g of methyl iodide (produced by Tokyo Chemical Industry Co., Ltd.) which was dissolved in 80.0 g of tetrahydrofuran was added dropwise over 30 minutes. The reaction solution was heated and refluxed for 12 hours, then 100 ml of water was added thereto, and the solvent was distilled off under reduced pressure. To the residue, 100 ml of ethanol was added, the mixture was stirred at room temperature, an insoluble material was removed by filtration through cerite, and then the solvent was distilled off again under reduced pressure. The obtained product was dissolved in 160 ml of pure water, 37.7 g of sodium heptafluorobutyrate (produced by FUJIFILM Wako Pure Chemical Corporation) was added as the anion raw material, and the mixture was stirred at room temperature for 1 hour. The obtained reaction solution was subjected to an extraction operation twice with the use of 100.0 g of ethyl acetate. Next, a separated ethyl acetate layer was washed three times with 60 g of ion-exchanged water. Subsequently, ethyl acetate was distilled off under reduced pressure, and an ionic compound I-2 was obtained. The ionic compound I-2 was a chemical compound represented by the following formula.

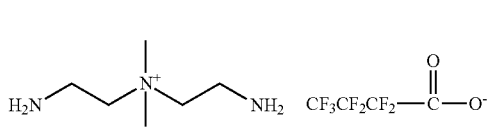

(I-2)

(Ionic Compound I-3)

2-(2-Methyl-1H-imidazole-1-yl) ethanol (produced by Sigma-Aldrich Co., LLC) in an amount of 15.0 g and sodium hydride, 60%, dispersion in liquid paraffin (produced by Tokyo Chemical Industry Co., Ltd.) in an amount of 9.2 g were dissolved in 80.0 g of tetrahydrofuran. Ethyl bromide (produced by Showa Chemical Industry Co., Ltd.) in an amount of 14.5 g, which was dissolved in 80.0 g of tetrahydrofuran, was added dropwise thereto at room temperature over 30 minutes, and the mixture was heated and refluxed at 85° C. for 12 hours. Next, 100 ml of water was added to the reaction solution, and the solvent was distilled off under reduced pressure. To the residue, 200 ml of ethanol was added, the mixture was stirred at room temperature, an insoluble material was removed by filtration through cerite, and then the solvent was distilled off again under reduced pressure. The obtained product was dissolved in 100 ml of pure water, 38.2 g of lithium N,N-bis(trifluoromethanesulfonyl)imide (trade name: EF-N115, produced by Mitsubishi Materials Electronic Chemicals Co., Ltd.) was added as the anion raw material, and the mixture was stirred at room temperature for 1 hour. To the reaction solution, 100 ml of ethyl acetate was added, and the organic layer was washed three times with the use of 80 g of ion-exchanged water. Next, ethyl acetate was distilled off under reduced pressure, and an ionic compound I-3 was obtained. The ionic compound I-3 was a chemical compound represented by the following formula.

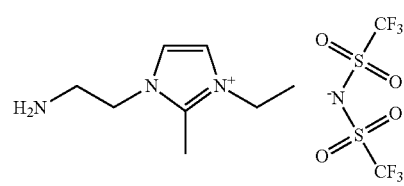

(I-3)

(Ionic Compound I-4)

Under a nitrogen atmosphere, 15.0 g of imidazole (produced by Nippon Gosei Kako Co., Ltd.) and 9.2 g of sodium hydride, 60%, dispersion in liquid paraffin (produced by Tokyo Chemical Industry Co., Ltd.) were dissolved in 60.0 g of tetrahydrofuran. 2-Bromoethanol (produced by Tokyo Chemical Industry Co., Ltd.) in an amount of 60.7 g, which was dissolved in 80.0 g of tetrahydrofuran, was added dropwise thereto at room temperature over 30 minutes, and then the mixture was heated and refluxed at 85° C. for 12 hours. Subsequently, 100 ml of water was added to the reaction solution, and the solvent was distilled off under reduced pressure. To the residue, 200 ml of ethanol was added, the mixture was stirred at room temperature, an insoluble material was removed by filtration through cerite, and then the solvent was distilled off again under reduced pressure. The obtained product was dissolved in 200 ml of pure water, 69.6 g of lithium N,N-bis(trifluoromethanesulfonyl)imide (trade name: EF-N115, produced by Mitsubishi Materials Electronic Chemicals Co., Ltd.) was added as the anion raw material, and the mixture was stirred at room temperature for 1 hour. To the reaction solution, 200 ml of ethyl acetate was added, and the organic layer was washed three times with the use of 120 g of ion-exchanged water. Next, ethyl acetate was distilled off under reduced pressure, and an ionic compound I-4 was obtained. The ionic compound I-4 was a chemical compound represented by the following formula.

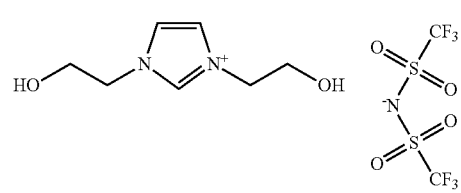

(I-4)

(Ionic Compound I-5)

Under a nitrogen atmosphere, 15.0 g of (1H-imidazole-2-yl) ethanol (produced by Sigma-Aldrich Co., LLC) and 9.2 g of sodium hydride, 60%, dispersion in liquid paraffin (produced by Tokyo Chemical Industry Co., Ltd.) were dissolved in 60.0 g of tetrahydrofuran. 2-Bromoethanol (produced by Tokyo Chemical Industry Co., Ltd.) in an amount of 42.1 g, which was dissolved in 80.0 g of tetrahydrofuran, was added dropwise thereto at room temperature over 30 minutes, and the mixture was heated and refluxed at 85° C. for 12 hours. Subsequently, 100 ml of water was added to the reaction solution, and the solvent was distilled off under reduced pressure. To the residue, 200 ml of ethanol was added, the mixture was stirred at room temperature, an insoluble material was removed by filtration through cerite, and then the solvent was distilled off again under reduced pressure. The obtained product was dissolved in 200 ml of pure water, 48.3 g of lithium N,N-bis(trifluoromethanesulfonyl)imide (trade name: EF-N115, produced by Mitsubishi Materials Electronic Chemicals Co., Ltd.) was added as the anion raw material, and the mixture was stirred at room temperature for 1 hour. To the reaction solution, 200 ml of ethyl acetate was added, and the organic layer was washed three times with the use of 120 g of ion-exchanged water. Next, ethyl acetate was distilled off under reduced pressure, and an ionic compound I-5 was obtained. The ionic compound I-5 was a chemical compound represented by the following formula.

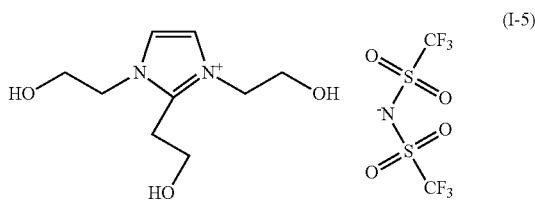

(I-5)

(Ionic Compound 1-6)

(5-Methylpyrazin-2-yl) methanol (produced by Sigma-Aldrich Co., LLC) in an amount of 15.0 g and sodium hydride, 60%, dispersion in liquid paraffin (produced by Tokyo Chemical Industry Co., Ltd.) in an amount of 9.2 g were dissolved in 80.0 g of tetrahydrofuran. Methyl iodide (produced by Tokyo Chemical Industry Co., Ltd.) in an amount of 18.9 g, which was dissolved in 80.0 g of tetrahydrofuran, was added dropwise thereto at room temperature over 30 minutes, and the mixture was heated and refluxed at 85° C. for 12 hours. Next, 100 ml of water was added to the reaction solution, and the solvent was distilled off under reduced pressure. To the residue, 200 ml of ethanol was added, the mixture was stirred at room temperature, an insoluble material was removed by filtration through cerite, and then the solvent was distilled off again under reduced pressure. The obtained product was dissolved in 100 ml of pure water, 59.8 g of potassium tris(trifluoromethanesulfonyl) methide (trade name: K-TFSM; produced by Central Glass Co., Ltd.) was added as the anion raw material, and the mixture was stirred at room temperature for 1 hour. To the reaction solution, 100 ml of ethyl acetate was added, and the organic layer was washed three times with the use of 80 g of ion-exchanged water. Next, ethyl acetate was distilled off under reduced pressure, and an ionic compound I-6 was obtained. The ionic compound I-6 was a chemical compound represented by the following formula.

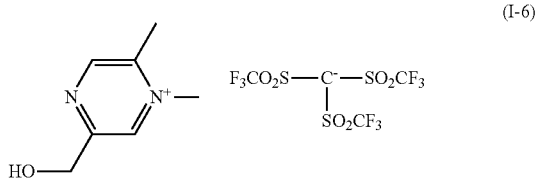

(I-6)

(Ionic Compound I-7)

N,N'-bis(2-hydroxyethyl)-2,5-dimethylpiperazine (produced by Sigma-Aldrich Co., LLC) in an amount of 15.0 g and sodium hydride, 60%, dispersion in liquid paraffin (produced by Tokyo Chemical Industry Co., Ltd.) in an amount of 9.2 g were dissolved in 80.0 g of tetrahydrofuran. Methyl iodide (produced by Tokyo Chemical Industry Co., Ltd.) in an amount of 11.6 g, which was dissolved in 80.0 g of tetrahydrofuran, was added dropwise thereto at room temperature over 30 minutes, and the mixture was heated and refluxed at 85° C. for 12 hours. Next, 100 ml of water was added to the reaction solution, and the solvent was distilled off under reduced pressure. To the residue, 200 ml of ethanol was added, the mixture was stirred at room temperature, an insoluble material was removed by filtration through cerite, and then the solvent was distilled off again under reduced pressure. The obtained product was dissolved in 100 ml of pure water, 23.4 g of lithium N,N-bis(trifluoromethanesulfonyl)imide (trade name: EF-N115, produced by Mitsubishi Materials Electronic Chemicals Co., Ltd.) was added as the anion raw material, and the mixture was stirred at room temperature for 1 hour. To the reaction solution, 100 ml of ethyl acetate was added, and the organic layer was washed three times with the use of 80 g of ion-exchanged water. Next, ethyl acetate was distilled off under reduced pressure, and an ionic compound I-7 was obtained. The ionic compound I-7 was a chemical compound represented by the following formula.

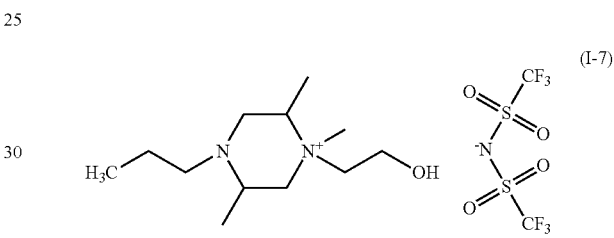

(I-7)

(Ionic Compound I-8)

4-Pyridin-4-yl-butan-1-ol (produced by Sigma-Aldrich Co., LLC) in an amount of 15.0 g was dissolved in 45.0 g of acetonitrile, 16.7 g of 4-bromo-1-butanol (produced by Tokyo Chemical Industry Co., Ltd.) was added dropwise thereto at room temperature over 30 minutes, and then the mixture was heated and refluxed at 90° C. for 12 hours. Next, the reaction solution was cooled to room temperature, and acetonitrile was distilled off under reduced pressure. The obtained concentrate was washed with 30.0 g of diethyl ether, and the supernatant was removed by liquid separation. The washing and separating operations were repeated three times, and a residue was obtained. Furthermore, the obtained residue was dissolved in 110.0 g of dichloromethane, and 31.4 g of an anion raw material: lithium N,N-bis(trifluoromethanesulfonyl)imide (trade name: EF-N115, produced by Mitsubishi Materials Electronic Chemicals Co., Ltd.) which was dissolved in 40.0 g of ion-exchanged water was added dropwise over 30 minutes, and the mixture was stirred at 30° C. for 12 hours. The obtained solution was separated, and the organic layer was washed 3 times with the use of 80.0 g of ion-exchanged water. Subsequently, dichloromethane was distilled off under reduced pressure, and an ionic compound I-8 was obtained. The ionic compound I-8 was a chemical compound represented by the following formula.

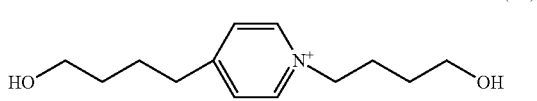

(I-8)

-continued

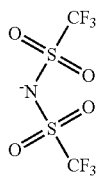

(Ionic Compound I-9)

2-(2-Hydroxyethyl)-1-methyl pyrrolidine (produced by Tokyo Chemical Industry Co., Ltd.) in an amount of 15.0 g and sodium hydride, 60%, dispersion in liquid paraffin (produced by Tokyo Chemical Industry Co., Ltd.) in an amount of 13.5 g were dissolved in 65.0 g of tetrahydrofuran. Next, the reaction system was placed under a nitrogen atmosphere, and was ice-cooled. Subsequently, 16.0 g of 2-bromoethanol (produced by Tokyo Chemical Industry Co., Ltd.) which was dissolved in 40.0 g of tetrahydrofuran was added dropwise over 30 minutes. The reaction solution was heated and refluxed for 12 hours, then 100 ml of water was added thereto, and the solvent was distilled off under reduced pressure. To the residue, 80 ml of ethanol was added, the mixture was stirred at room temperature, an insoluble material was removed by filtration through cerite, and then the solvent was distilled off again under reduced pressure. The obtained product was dissolved in 160 ml of pure water, 36.7 g of lithium N,N-bis(trifluoromethanesulfonyl)imide (trade name: EF-N115, produced by Mitsubishi Materials Electronic Chemicals Co., Ltd.) was added as the anion raw material, and the mixture was stirred at room temperature for 1 hour. To the reaction solution, 70 ml of chloroform was added, 40 ml of a 5 mass % solution of sodium carbonate was added thereto, the mixture was stirred for 30 minutes, the mixture was separated, and the chloroform layer was washed three times with the use of 50 g of ion-exchanged water. Next, chloroform was distilled off under reduced pressure, and an ionic compound I-9 was obtained. The ionic compound I-9 was a chemical compound represented by the following formula.

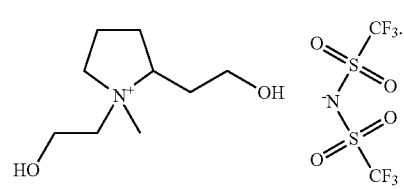

Table 1 shows the structure which the ionic compound has, and the relation to R1 to R9 and Z1 to Z17 in each structural formula, for each ionic compound used in Examples.

TABLE 1

| Ionic compound Number | Structural formula described in the claim corresponding to the ionic compound on left | Contents of R in structural formula on left | Contents of Z in structural formula on left | | | Contents of d in structural formula on left |
|---|---|---|---|---|---|---|
| I-1 | Structural formula (1) | R1<br>—CH$_3$ | Z1<br>Z101<br>R10:<br>—C$_2$H$_4$— | Z2<br>—CH$_3$ | Z3<br>Z101<br>R10:<br>—C$_2$H$_4$— | |
| I-2 | Structural formula (1) | R1<br>—CH$_3$ | Z1<br>Z102<br>R11:<br>—C$_2$H$_4$— | Z2<br>—CH$_3$ | Z3<br>Z102<br>R11:<br>—C$_2$H$_4$— | |
| I-3 | Structural formula (2) | R2, R3<br><br>—N≡N$^+$—<br>\|<br> | Z4<br>Z101<br>R10:<br>—C$_2$H$_4$— | Z5<br>—C$_2$H$_5$ | Z6<br>—CH$_3$ | d1<br>1 |
| I-4 | Structural formula (2) | R2, R3<br><br>—N≡N$^+$—<br> | Z4<br>Z101<br>R10:<br>—C$_2$H$_4$— | Z5<br>Z101<br>R10:<br>—C$_2$H$_4$— | Z6<br> | d1<br>0 |
| I-5 | Structural formula (2) | R2, R3<br><br>—N≡N$^+$—<br>\|<br> | Z4<br>Z101<br>R10:<br>—C$_2$H$_4$— | Z5<br>Z101<br>R10:<br>—C$_2$H$_4$— | Z6<br>Z101<br>R10:<br>—C$_2$H$_4$— | d1<br>1 |

TABLE 1-continued

| Ionic compound Number | Structural formula described in the claim corresponding to the ionic compound on left | Contents of R in structural formula on left | Contents of Z in structural formula on left | | | | Contents of d in structural formula on left |
|---|---|---|---|---|---|---|---|
| I-6 | Structural formula (3) | R4, R5 | Z7 —CH$_3$ | Z8 Z101 R10: —C$_2$H$_4$— | Z8 —CH$_3$ | | d2 2 |
| I-7 | Structural formula (4) | R6, R7 | Z9 Z101 R10: —C$_2$H$_4$— | Z10 —CH$_3$ | Z11 Z101 R10: —C$_2$H$_4$— | Z12 —CH$_3$ | d3 2 |
| I-8 | Structural formula (5) | R8 | Z13 Z101 R10: —C$_2$H$_4$— | Z14 Z101 R10: —C$_2$H$_4$— | | | d4 1 |
| I-9 | Structural formula (6) | R9 | Z15 —CH$_3$ | Z16 Z101 R10: —C$_2$H$_4$— | Z17 Z101 R10: —C$_2$H$_4$— | | d5 1 |

Example 1

[Production of Electro-Conductive Substrate]

A primer (trade name: DY35-051, produced by Dow Corning Toray Co., Ltd.) was applied to a core metal made from SUS304 having an outer radius of 6 mm and a length of 270 mm, and was heated at a temperature of 150° C. for 20 minutes. The core metal was installed in a cylindrical mold having an inner diameter of 12.0 mm, so as to become concentric.

As a material of an intermediate layer, an addition type silicone rubber composition obtained by mixing the materials shown in the following Table 2 with a kneader (trade name: Trimix TX-15, manufactured by Inoue Manufacturing Co., Ltd.) was injected into the mold which was heated to a temperature of 115° C. After the material was injected, the material was heated and molded at a temperature of 120° C. for 10 minutes, was cooled to room temperature, and then was removed from the mold; and an electro-conductive substrate (elastic roller) was obtained in which the intermediate layer having a thickness of 3.0 mm was formed on the outer periphery of the core metal.

TABLE 2

| Material | Parts by mass |
|---|---|
| Liquid dimethylpolysiloxane having two or more silicon atom-bonded alkenyl groups in one molecule (trade name: SF3000E, viscosity 10000 cP, vinyl group equivalent 0.05 mmol/g, produced by KCC) | 100 |
| Platinum-based catalyst (trade name: SIP6832.2, produced by Gelest Inc.) | 0.048 |
| Dimethylpolysiloxane having two or more silicon atom-bonded hydrogen atoms in one molecule (trade name: SP6000P, Si—H group equivalent 15.5 mmol/g, produced by KCC) | 0.5 |
| Carbon black (trade name: TOKABLACK #7360SB, produced by Tokai Carbon Co., Ltd.) | 6 |

[Surface Treatment of Electro-Conductive Substrate]

As is illustrated in FIG. 2, four electro-conductive substrates 44 were arranged on a concentric circle of an excimer UV lamp 12 which was mounted in a lamp holder 11 with a built-in water-cooled heat sink. After that, the electro-conductive substrates 44 were irradiated with excimer light emitted from the excimer UV lamp 12, while being rotated at 60 rpm, and the intermediate layer 3 was surface-treated. At this time, the illumination intensity of the excimer UV lamp 12 was set to become 25 mW/cm$^2$ on the surface of the intermediate layer 3, and the surface treatment was performed so that the irradiation amount became 150 mJ/cm$^2$ in terms of a cumulative amount of light.

[Formation of Surface Layer]

In forming the surface layer, firstly, a resin layer was formed. As a material of the resin layer, materials other than the roughness forming particle shown in the following Table 3 were stirred and mixed. After that, the resultant mixture was dissolved in methyl ethyl ketone (produced by Kishida Chemical Co., Ltd.) so that the solid content concentration became 30% by mass, was mixed, and then was uniformly dispersed with a sand mill. Methyl ethyl ketone was added to this mixed solution, the solid content concentration was adjusted to 25% by mass, the material shown in the column of the roughness forming particle in Table 2 was added thereto, the mixture was stirred and dispersed by a ball mill, and a coating material 1 for a resin layer was obtained. The above elastic roller was immersed in and coated with this coating material, and thereby, the coating material was applied so that the film thickness of the resin layer after drying became approximately 15 μm. After that, the coating film was dried and cured by heating at a temperature of 130° C. for 60 minutes, and the resin layer was formed.

TABLE 3

| Material | Parts by mass |
| --- | --- |
| Polyether polyol (trade name: PTGL1000, produced by Hodogaya Chemical Co., Ltd.) | 100 |
| Polymeric MDI (trade name: MR-400, produced by Tosoh Corporation) | 37.2 |
| Ionic compound (I-1) | 68.4 |
| Carbon black (trade name: SUNBLACK X15, produced by Asahi Carbon Co., Ltd.) | 26.9 |
| Polyether monool (trade name: NEWPOL 50HB100, produced by Sanyo Chemical Industries Ltd.) | 3 |
| Roughness-forming particle (trade name: Dynamic Beads UCN-5090, produced by Dainichiseika Kogyo Co., Ltd.) | 17.8 |

Subsequently, the impregnation and curing process of the acrylic monomer was performed by the following method. As materials of an impregnation treatment liquid for the impregnation treatment, materials shown in the following Table 4 were dissolved and mixed. The elastic roller on which the resin layer was formed was immersed in the impregnation treatment liquid for 2 seconds, and was impregnated with the acrylic monomer component. After that, the solvent was then volatilized by air-drying at room temperature for 30 minutes and drying at 90° C. for 1 hour. The elastic roller after having being dried was irradiated with ultraviolet rays so that the cumulative amount of light became 15000 mJ/cm$^2$, while being rotated, thereby the acrylic monomer was cured, and the surface layer was formed. For information, as the UV irradiation apparatus, a high-pressure mercury-vapor lamp (trade name: handy type UV curing apparatus, model: MDH2501N-02, manufactured by Marionetwork Co., Ltd.) was used.

TABLE 4

| Material | Parts by mass |
| --- | --- |
| Bifunctional acrylic monomer (trade name: EBECRYL145, produced by Daicel Allnex Ltd.) | 5 |
| Photopolymerization initiator (trade name: IRGACURE184, produced by BASF) | 0.25 |
| Solvent (trade name: methyl ethyl ketone, produced by Kishida Chemical Co., Ltd.) | 100 |

The obtained developing roller was evaluated in the following way.
[Evaluation Method]
<Measurement of T1, T2, A1 and A2>
Thermal chromatograms of samples which were sampled from each of the previously described first area and the second area were obtained by the previously described microsampling mass spectrometry. The peak top temperature, T1 and T2 of the thermal chromatograms derived from the respective crosslinked urethane resins in the first area and the second area were obtained from the obtained thermal chromatograms. In addition, a peak top temperature A1 of the thermal chromatogram was obtained that was derived from the crosslinked acrylic resin or the crosslinked epoxy resin, from the first sample in the first area, and a peak top temperature A2 of the thermal chromatogram was obtained that was derived from the crosslinked acrylic resin or crosslinked epoxy resin, and was measured from a second sample which was obtained by the decomposition of the crosslinked urethane resin contained in the first sample.

For information, as for the second area, the surface of the roller is polished and removed by a predetermined depth with the use of a rubber roll mirror finishing machine (trade name: SZC, produced by Minakuchi Machinery Works Ltd.), and a thin piece is cut out from the newly appeared surface similarly by a microtome. Furthermore, a sample (third sample) for the microsampling mass spectrometry was collected from the thin piece. In addition, the A2 is a value obtained by the microsampling mass spectrometry of a second sample which has been obtained after the decomposition of the crosslinked urethane by a pyridine decomposition method which will be described later. Each value is a value obtained by arithmetically averaging the peak temperatures which were obtained by five measurements. The results are shown in Table 8.

<Pyridine Decomposition Method>

The pyridine decomposition method is a method of selectively decomposing the urethane bond. When a sample having an IPN structure of the crosslinked acrylic resin or the crosslinked epoxy resin and the crosslinked urethane resin is subjected to the pyridine decomposition method, the crosslinked acrylic resin or the crosslinked epoxy resin from which the structure derived from the crosslinked urethane has been removed can be obtained, and a change of the peak temperature in the thermal chromatogram due to the presence or absence of the IPN structure can be captured. The pyridine decomposition method was performed according to the following specific method.

A sample having a thickness of 0.1 μm was cut out from the surface of the developing roller with the use of a microtome, and a quantity of 500 mg was collected. To the obtained sample, 0.5 mL of a mixture liquid was added which was obtained by mixing pyridine (produced by Wako Pure Chemical Industries, Ltd.) and water at a ratio of 3:1, the resultant mixture was heated at 130° C. for 15 hours in a closed container made from fluororesin ("Teflon" (registered trademark)) provided with a stainless-steel jacket, and thereby the urethane bond was decomposed. The obtained decomposition product was subjected to decompression treatment, and thereby pyridine was removed. The sample thus obtained was used for the above microsampling mass spectrometry, and the A2 value was obtained.

<Measurement of Volatile Content of Carbon Black>

Into a flask equipped with Dimroth, 10 parts by mass of the surface layer which was peeled off from the developing roller, 100 parts by mass of diethanolamine (produced by Tokyo Chemical Industry Co., Ltd.) as a decomposing agent and 0.5 parts by mass of pure water were added, and the mixture was heated and refluxed at 160° C. for 20 hours while being stirred. To the solution after the reaction, 25 parts by mass of methyl ethyl ketone is added, and the mixture is subjected to centrifugation. Furthermore, the resultant product was washed twice with 80 parts by mass of methyl ethyl ketone, was centrifuged, and was dried under reduced pressure, and carbon black contained in the surface layer was obtained. From the carbon black thus obtained, 1.5 g is collected, and the volatile content of the carbon black is measured according to the provisions of "Carbon Black Test Method for Rubber" in Japanese Industrial Standards (JIS) K6221 (1982). Specifically, the carbon black was placed in a crucible, was heated at 950° C. for 7 minutes and was air-cooled; then the mass was measured; and the weight loss was calculated. The volatile content of the sample was determined to be such a value that the weight loss with respect to the original mass was expressed by mass. The results are shown in Table 8.

<Evaluation of Fogging in High-Temperature and High-Humidity Environment>

Fogging is an image defect that appears as background contamination due to toner being slightly developed in a white portion (unexposed portion) which should not be originally printed.

The developing roller was mounted on a process cartridge for a color laser printer (trade name: HP Color Laser Jet Enterprise M653dn, manufactured by HP Inc.), the process cartridge was mounted on the color laser printer, and the fogging amount was evaluated in the following way.

For the evaluation, a cyan process cartridge (trade name: HP 656X High Yield Cyan Original Laser Jet Toner Cartridge, manufactured by HP Inc.) for the above color laser printer was used. The cyan process cartridge was left to stand for 16 hours in a high-temperature and high-humidity environment at a temperature of 32° C. and a relative atmospheric humidity of 95%, and then a low printed image having a print ratio of 0.2% was continuously output on the recording sheets, in order to evaluate printing on an extremely large number of sheets in the same environment. However, the toner was replenished every time 50 thousand sheets were output so that the weight of the toner in the process cartridge became 100 g, because the toner was consumed by printing. After 200,000 sheets have been printed, the electrophotographic apparatus is stopped while a solid white image is printed. The toner on a photoreceptor after development and before transfer was once transferred to a transparent tape, and the tape to which the toner was attached was attached to a recording paper or the like. In addition, on the same recording paper, a tape to which the toner was not attached was also attached, at the same time. An optical reflectance through the tape attached to the recording paper was measured through a green filter from above, with an optical reflectance measuring instrument (TC-6DS manufactured by Tokyo Denshoku Co., Ltd.), and the reflectance was subtracted from the reflectance of the tape to which the toner was not attached; and the reflectance amount corresponding to the fogging was determined, and was evaluated as the fogging amount. The fogging amount was measured at three or more points on the tape, and the average value thereof was determined.

Rank A: the fogging amount is smaller than 1.0%.
Rank B: the fogging amount is 1.0% or larger and smaller than 3.0%.
Rank C: the fogging amount is 3.0% or larger and smaller than 5.0%.
Rank D: the fogging amount is 5.0% or larger.

The evaluation results are shown in the following Table 8.

Examples 2 to 19

Developing rollers were produced in the same manner as in Example 1, by preparing coating materials for resin layers from materials shown in Table 5, respectively, preparing impregnation treatment liquids from materials shown in Table 6, respectively, and further using the combinations shown in Table 7, respectively. The obtained developing rollers were evaluated in the same manner as in Example 1.

Example 20

A developing roller was produced in the same manner as in Example 1 except that the time of immersion in the impregnation treatment liquid was changed to 10 minutes, and was evaluated in the same manner as in Example 1.

Comparative Examples 1 to 3

Coating materials for the resin layer were prepared from the materials shown in Table 5; and developing rollers were produced in the same manner as in Example 1 except that the impregnation with the impregnation treatment liquid and the curing treatment were not performed, and were evaluated in the same manner as in Example 1.

Comparative Examples 4 to 6

Developing rollers were produced in the same manner as in Example 1, by preparing coating materials for resin layers from materials shown in Table 5, respectively, preparing impregnation treatment liquids from materials shown in Table 6, respectively, and further using the combinations shown in Table 7, respectively. The obtained developing rollers were evaluated in the same manner as in Example 1. The evaluation results are shown in Table 8.

TABLE 5

| | | Coating material for resin layer | | | | | | | | | | | | | | | |
|---|---|---|---|---|---|---|---|---|---|---|---|---|---|---|---|---|---|
| Classification | Material name | 1 | 2 | 3 | 4 | 5 | 6 | 7 | 8 | 9 | 10 | 11 | 12 | 13 | 14 | 15 | 16 |
| Polyol | PTGL1000 | 100 | — | 100 | 100 | 100 | 100 | 100 | 100 | 100 | 100 | 100 | 100 | 100 | 100 | 100 | 100 |
| | PTMG1000 | — | 100 | — | — | — | — | — | — | — | — | — | — | — | — | — | — |
| Isocyanate | MR-400 | 37.2 | 37.2 | 37.2 | 37.2 | 37.2 | 37.2 | 37.2 | 37.2 | 37.2 | 37.2 | 37.2 | 37.2 | 37.2 | 37.2 | 37.2 | 37.2 |
| Ionic compound | I-1 | — | — | — | — | 68.4 | — | — | — | — | — | — | — | — | — | — | — |
| | I-2 | — | — | — | — | — | 68.4 | — | — | — | — | — | — | — | — | — | — |
| | I-3 | — | — | — | 68.4 | — | — | — | — | — | — | — | — | — | — | — | — |
| | I-4 | 68.4 | 68.4 | — | — | — | — | — | — | — | — | 68.4 | 68.4 | 68.4 | 114.0 | 68.4 | 68.4 |
| | I-5 | — | — | 68.4 | — | — | — | — | — | — | — | — | — | — | — | — | — |
| | I-6 | — | — | — | — | — | — | 68.4 | — | — | — | — | — | — | — | — | — |
| | I-7 | — | — | — | — | — | — | — | 68.4 | — | — | — | — | — | — | — | — |
| | I-8 | — | — | — | — | — | — | — | — | 68.4 | — | — | — | — | — | — | — |
| | I-9 | — | — | — | — | — | — | — | — | — | 68.4 | — | — | — | — | — | — |

TABLE 5-continued

| Classification | Material name | Coating material for resin layer |||||||||||||||| 
| | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Carbon black | SUNBLACK X15 | 26.9 | 26.9 | 26.9 | 26.9 | 26.9 | 26.9 | 26.9 | 26.9 | 26.9 | 26.9 | 21 | — | — | — | 26.9 | 26.9 |
| | #5 | — | — | — | — | — | — | — | — | — | — | — | 26.9 | — | — | — | — |
| | #4000 | — | — | — | — | — | — | — | — | — | — | — | — | 26.9 | — | — | — |
| Silica | AEROSIL50 | — | — | — | — | — | — | — | — | — | — | 5.9 | — | — | 26.9 | — | — |
| Monool component | 50HB100 | 3 | 3 | 3 | 3 | 3 | 3 | 3 | 3 | 3 | 3 | 3 | 3 | 3 | 3 | 3 | 3 |
| Others | MX-15 | — | — | — | — | — | — | — | — | — | — | — | — | — | — | 5 | — |
| | LCB-19 | — | — | — | — | — | — | — | — | — | — | — | — | — | — | — | 5 |
| Roughness-forming particle | UCN-5090 | 17.8 | 17.8 | 17.8 | 17.8 | 17.8 | 17.8 | 17.8 | 17.8 | 17.8 | 17.8 | 17.8 | 17.8 | 17.8 | 17.8 | 17.8 | 17.8 |

\* The numbers in the Table represent an amount of each material to be blended by parts by mass.
\* The materials shown in the Table are the following materials, respectively.
"PTGL1000": trade name; polyol produced by Hodogaya Chemical Co., Ltd.
"PTMG1000": trade name; polyol produced by Mitsubishi Chemical Corporation.
"MR-400" ("Millionate MR-400"; trade name; isocyanate compound (polymeric MDI) produced by Tosoh Corporation).
"SUNBLACK X15" (trade name; carbon black produced by Asahi Carbon Co., Ltd. (volatile content: 2.1%))
"#5": (trade name; carbon black produced by Mitsubishi Chemical Corporation (volatile content: 0.4%)).
"#4000": (trade name; carbon black produced by Mitsubishi Chemical Corporation (volatile content: 0.3%)).
"AEROSIL50": silica produced by Nippon Aerosil Co., Ltd.
"50HB-100" (Newpol 50HB-100): monool (poly(oxyethyleneoxypropylene) glycol monobutyl ether, molecular weight Mn = 510) produced by Sanyo Chemical Industries, Ltd.
"MX-150" (Chemisnow MX-150): crosslinked acrylic particle produced by Soken Chemical & Engineering Co., Ltd.
"LCB-19": trade name; chain acrylic resin produced by Mitsubishi Chemical Corporation
"UCN-5090": crosslinked urethane resin particle having average particle size of 9 μm produced by Dainichiseika Color & Chemicals Mfg. Co., Ltd.

TABLE 6

| Classification | Material name | Presence or absence of ether group | Number of functional groups | Impregnation treatment liquid |||||||| 
| | | | | 1 | 2 | 3 | 4 | 5 | 6 | 7 | 8 |
|---|---|---|---|---|---|---|---|---|---|---|---|
| Acrylic monomer | EBECRYL 145 | Present | 2 | 5 | — | — | — | — | — | — | — |
| | EBECRYL 11 | Present | 2 | — | 5 | — | — | — | — | — | — |
| | NK Ester 9G | Present | 2 | — | — | 5 | — | — | — | — | — |
| | EBECRYL 160S | Present | 3 | — | — | — | 5 | — | — | — | — |
| | HDDA | Absent | 2 | — | — | — | — | — | — | 5 | — |
| | TMPTA | Absent | 3 | — | — | — | — | — | — | — | 5 |
| Glycidyl ether | Ethylene glycol diglycidyl ether | Present | 2 | — | — | — | — | 5 | — | — | — |
| | Neopentyl glycol diglycidyl ether | Present | 2 | — | — | — | — | — | 5 | — | — |
| Initator | San-aid SI-110L | — | — | — | — | — | — | 0.1 | 0.1 | — | — |
| | IRGACURE 184 | — | — | 0.25 | 0.25 | 0.25 | 0.25 | — | — | 0.25 | 0.25 |
| Solvent | Methyl ethyl ketone | — | — | 100 | 100 | 100 | 100 | 100 | 100 | 100 | 100 |

\* The numbers in the Table represent an amount of each material to be blended, by parts by mass.
\* The materials shown in the Table are the following materials, respectively.
EBECRYL145: bifunctional acrylic monomer produced by Daicel-Allnex Ltd.
EBECRYL11: bifunctional acrylic monomer produced by Daicel-Allnex Ltd.
NK Ester 9G: bifunctional acrylic monomer produced by Shin-Nakamura Chemical Co., Ltd.
EBECRYL160S: trifunctional acrylic monomer produced by Daicel-Allnex Ltd.
HDDA: bifunctional acrylic monomer produced by Daicel-Allnex Ltd.
TMPTA: trifunctional acrylic monomer produced by Daicel-Allnex Ltd.
Ethylene glycol diglycidyl ether: bifunctional glycidyl ether monomer produced by Tokyo Chemical Industry Co., Ltd.
Neopentyl glycol diglycidyl ether: bifunctional glycidyl ether monomer produced by Tokyo Chemical Industry Co., Ltd.
San-Aid SI-110L: photopolymerization initiator; PF6/aromatic sulfonium salt, produced by Sanshin Chemical Industry Co., Ltd.
IRGACURE184: optical polymerization initiator produced by BASF

TABLE 7

| | Coating material for resin layer | Impregnation treatment liquid | Impregnation time |
|---|---|---|---|
| Example 1 | Coating material for resin layer 1 | Impregnation treatment liquid 1 | Two seconds |
| Example 2 | Coating material for resin layer 2 | Impregnation treatment liquid 1 | Two seconds |
| Example 3 | Coating material for resin layer 3 | Impregnation treatment liquid 1 | Two seconds |
| Example 4 | Coating material for resin layer 4 | Impregnation treatment liquid 1 | Two seconds |
| Example 5 | Coating material for resin layer 5 | Impregnation treatment liquid 1 | Two seconds |
| Example 6 | Coating material for resin layer 6 | Impregnation treatment liquid 1 | Two seconds |

TABLE 7-continued

|  | Coating material for resin layer | Impregnation treatment liquid | Impregnation time |
|---|---|---|---|
| Example 7 | Coating material for resin layer 7 | Impregnation treatment liquid 1 | Two seconds |
| Example 8 | Coating material for resin layer 8 | Impregnation treatment liquid 1 | Two seconds |
| Example 9 | Coating material for resin layer 9 | Impregnation treatment liquid 1 | Two seconds |
| Example 10 | Coating material for resin layer 10 | Impregnation treatment liquid 1 | Two seconds |
| Example 11 | Coating material for resin layer 11 | Impregnation treatment liquid 1 | Two seconds |
| Example 12 | Coating material for resin layer 12 | Impregnation treatment liquid 1 | Two seconds |
| Example 13 | Coating material for resin layer 13 | Impregnation treatment liquid 1 | Two seconds |
| Example 14 | Coating material for resin layer 14 | Impregnation treatment liquid 1 | Two seconds |
| Example 15 | Coating material for resin layer 14 | Impregnation treatment liquid 2 | Two seconds |
| Example 16 | Coating material for resin layer 14 | Impregnation treatment liquid 3 | Two seconds |
| Example 17 | Coating material for resin layer 14 | Impregnation treatment liquid 4 | Two seconds |
| Example 18 | Coating material for resin layer 14 | Impregnation treatment liquid 5 | Two seconds |
| Example 19 | Coating material for resin layer 14 | Impregnation treatment liquid 6 | Two seconds |
| Example 20 | Coating material for resin layer 14 | Impregnation treatment liquid 1 | Ten minutes |
| Comparative Example 1 | Coating material for resin layer 1 | — | — |
| Comparative Example 2 | Coating material for resin layer 15 | — | — |
| Comparative Example 3 | Coating material for resin layer 16 | — | — |
| Comparative Example 4 | Coating material for resin layer 1 | Impregnation treatment liquid 7 | Two seconds |
| Comparative Example 5 | Coating material for resin layer 14 | Impregnation treatment liquid 7 | Two seconds |
| Comparative Example 6 | Coating material for resin layer 1 | Impregnation treatment liquid 8 | Two seconds |

TABLE 8

|  | Cation structure in first resin | Second resin type | Carbon black volatile content [%] | A1 [° C.] | A2 [° C.] | T1 [° C.] | T2 [° C.] | Fogging |
|---|---|---|---|---|---|---|---|---|
| Example 1 | Structural formula (2) | Acrylic | 2.10 | 395.3 | 392.1 | 382.4 | 378.1 | A |
| Example 2 | Structural formula (2) | Acrylic | 2.13 | 395.3 | 392.1 | 382.4 | 378.1 | A |
| Example 3 | Structural formula (2) | Acrylic | 2.13 | 395.3 | 392.1 | 382.4 | 378.1 | A |
| Example 4 | Structural formula (2) | Acrylic | 2.05 | 395.2 | 392.1 | 382.3 | 378.1 | A |
| Example 5 | Structural formula (1) | Acrylic | 2.10 | 395.1 | 392.2 | 382.2 | 378.1 | B |
| Example 6 | Structural formula (1) | Acrylic | 2.07 | 395.2 | 392.2 | 382.3 | 378.2 | B |
| Example 7 | Structural formula (3) | Acrylic | 2.07 | 395.3 | 392.1 | 382.4 | 378.1 | A |
| Example 8 | Structural formula (4) | Acrylic | 2.02 | 395.1 | 392.1 | 382.2 | 378.2 | B |
| Example 9 | Structural formula (5) | Acrylic | 2.01 | 395.3 | 392.1 | 382.4 | 378.2 | A |
| Example 10 | Structural formula (6) | Acrylic | 2.12 | 395.1 | 392.1 | 382.2 | 378.2 | B |
| Example 11 | Structural formula (2) | Acrylic | 2.13 | 395.3 | 392.2 | 382.4 | 378.2 | A |
| Example 12 | Structural formula (2) | Acrylic | 0.41 | 395.3 | 392.2 | 382.4 | 378.2 | A |
| Example 13 | Structural formula (2) | Acrylic | 0.32 | 395.1 | 392.2 | 382.1 | 378.2 | B |
| Example 14 | Structural formula (2) | Acrylic | 2.05 | 395.1 | 392.1 | 382.1 | 378.1 | B |
| Example 15 | Structural formula (2) | Acrylic | 2.15 | 395.1 | 392.2 | 382.1 | 378.2 | B |
| Example 16 | Structural formula (2) | Acrylic | 2.06 | 395.1 | 392.2 | 382.1 | 378.1 | B |
| Example 17 | Structural formula (2) | Acrylic | 2.08 | 395.0 | 392.2 | 381.0 | 378.2 | C |
| Example 18 | Structural formula (2) | Epoxy | 2.03 | 395.1 | 392.1 | 382.1 | 378.2 | B |
| Example 19 | Structural formula (2) | Epoxy | 2.05 | 395.1 | 392.1 | 382.1 | 378.2 | B |
| Example 20 | Structural formula (2) | Acrylic | 2.14 | 395.2 | 392.2 | 382.1 | 382.1 | C |
| Comparative Example 1 | Structural formula (2) | — | 2.10 | — | — | 378.1 | 378.1 | D |
| Comparative Example 2 | Structural formula (2) | — | 2.02 | — | 390.2 | 378.1 | 378.1 | D |
| Comparative Example 3 | Structural formula (2) | — | 2.03 | 380.2 | 380.2 | 378.2 | 378.2 | D |
| Comparative Example 4 | Structural formula (2) | Acrylic* | 2.13 | — | 392.2 | 378.1 | 378.2 | D |
| Comparative Example 5 | Structural formula (2) | Acrylic* | 2.12 | 394.9 | 392.1 | 377.9 | 378.1 | D |
| Comparative Example 6 | Structural formula (2) | Acrylic* | 2.13 | 394.9 | 392.2 | 377.9 | 378.2 | D |

*Having no ether bond

[Discussion on Evaluation Results]

Any of the electrophotographic members in Examples 1 to 20 has the elastic layer as the surface layer, and contains the first resin and the second resin. The second resin is at least one of the crosslinked acrylic resin having an ether bond (—C—O—C—) and the crosslinked epoxy resin having the ether bond (—C—O—C—). In addition, any of the electrophotographic members satisfies the condition of A1>A2, and it can be confirmed that the crosslinked urethane resin and the crosslinked acrylic resin or crosslinked urethane resin constitute the IPN structure in the first area that is an area from the outer surface of the surface layer to a depth of 0.1 μm. Thereby, high-quality electrophotographic images can be obtained which do not cause the fogging also in the durability evaluation by the printing of a large number of sheets in a high-temperature and high-humidity environment.

While Example 20 has T1=T2, Example 14 satisfies T1>T2, and a high-quality electrophotographic image can be obtained in which the fogging less occurs.

In Example 17, the surface layer is formed with the use of an impregnation treatment liquid containing a trifunctional monomer, but on the other hand, in Examples 14 to 16, 18 and 19, the surface layer is formed with the use of an impregnation treatment liquid containing a bifunctional monomer. However, the latters can obtain an electrophotographic image of a higher quality with less occurrence of the fogging.

In Example 13, carbon black having a volatile content of less than 0.4% is used, but on the other hand, in Examples 12 and 14, carbon black having a volatile content of 0.4% or more is used, and the latters can obtain an electrophotographic image of a higher quality with less occurrence of the fogging.

In Examples 5, 6, 8 and 10, non-aromatic ring cations are used as ionic compounds, respectively, but on the other hand, in Examples 1 to 4, 7 and 9, nitrogen-containing aromatic ring cations are used, respectively. However, the latters can obtain an electrophotographic image of a higher quality with less occurrence of the fogging.

On the other hand, in Comparative Example 1, the step of the impregnation with an acrylic monomer or a glycidyl ether monomer, and the step of curing the impregnating acrylic monomer or glycidyl ether monomer were not performed. As a result, the surface layer does not contain the IPN structure, and accordingly the electrophotographic image becomes a low quality with an occurrence of the fogging.

In Comparative Example 2, the surface layer contains the crosslinked acrylic particle, but the step of impregnating the outer surface of the surface layer with an acrylic monomer or a glycidyl ether monomer, and the step of curing the impregnating acrylic monomer or glycidyl ether monomer are not performed. Because of this, the surface layer does not contain the IPN structure, and the electrophotographic image becomes a low quality with an occurrence of the fogging. In Comparative Example 3, the chain acrylic polymer is contained, but the IPN structure is not contained (A1=A2), and accordingly, the electrophotographic image becomes a low quality with an occurrence of the fogging.

In Comparative Examples 4 to 6, the IPN structure is contained (A1>A2), but an acrylic monomer having an ether bond is not used; and accordingly, the molecular mobility of the cation is not sufficiently suppressed, and the electrophotographic image becomes a low quality with an occurrence of the fogging.

According to one aspect of the present disclosure, an electrophotographic member can be obtained that can maintain a high image quality and high durability even in an electrophotographic process at a high speed. According to another aspect of the present disclosure, a process cartridge can be obtained that contributes to stable formation of an electrophotographic image of high quality. In addition, according to another aspect of the present disclosure, an electrophotographic image forming apparatus can be obtained that can stably form the electrophotographic image of high quality.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An electrophotographic member comprising an electro-conductive substrate, and an elastic layer as a surface layer, the elastic layer being constituted by a single-layer, wherein
   the elastic layer comprises a first resin, a second resin and an anion,
   the first resin is a crosslinked urethane resin,
   the crosslinked urethane resin has at least one cationic structure selected from the group consisting of the following structural formulae (1) to (6) in a molecule,
   the second resin is at least one of a crosslinked acrylic resin having an ether bond and a crosslinked epoxy resin having an ether bond, and
   in a first area of the elastic layer, the first area being from an outer surface of the elastic layer to a depth of 0.1 μm, the first resin and the second resin form an interpenetrating polymer network structure:

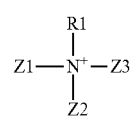

Structural Formula (1)

wherein R1 represents a hydrogen atom, or a monovalent hydrocarbon group having 1 to 4 carbon atoms, and Z1 to Z3 each independently represent any structure selected from the group consisting of structures represented by structural formulae (Z101) and (Z102), or a monovalent hydrocarbon group having 1 to 4 carbon atoms, provided that at least one of Z1 to Z3 is any structure selected from the group consisting of the structures represented by the structural formulae (Z101) and (Z102);

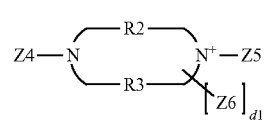

Structural Formula (2)

wherein R2 and R3 each represent a divalent hydrocarbon group necessary for forming a nitrogen-containing heteroaromatic five-membered ring together with a nitrogen atom to which each is bonded, Z4 and Z5 each independently represent any structure selected from the group consisting of the structures represented by the structural formulae (Z101) and (Z102), a hydrogen atom, or a monovalent hydrocarbon group having 1 to 4 carbon atoms, Z6 represents any structure selected from the group consisting of the structures represented by the structural formulae (Z101) and (Z102), or a monovalent hydrocarbon group having 1 to 4 carbon atoms, and d1 represents an integer of 0 or 1, provided that at least one of Z4 to Z6 is any structure selected from the group consisting of the structures represented by the structural formulae (Z101) and (Z102);

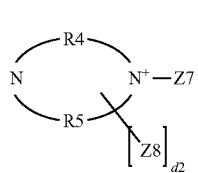

Structural Formula (3)

wherein R4 and R5 each represent a divalent hydrocarbon group necessary for forming a nitrogen-containing heteroaromatic six-membered ring together with a nitrogen atom to which each is bonded, Z7 represents any structure selected from the group consisting of the structures represented by the structural formulae (Z101) and (Z102), a hydrogen atom, or a monovalent hydrocarbon group having 1 to 4 carbon atoms, Z8 represents any structure selected from the group consisting of the structures represented by the structural formulae (Z101) and (Z102), or a monovalent hydrocarbon group having 1 to 4 carbon atoms, d2 represents an integer of 0 to 2, and when d2 is 2, Z8 may be the same or different from each other; provided that at least one of Z7 and Z8 is any structure selected from the group consisting of the structures represented by the structural formulae (Z101) and (Z102);

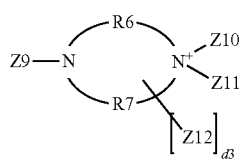

Structural Formula (4)

wherein R6 and R7 each represent a divalent hydrocarbon group necessary for forming a nitrogen-containing heteroalicyclic group together with a nitrogen atom to which each is bonded, Z9 to Z11 each independently represent any structure selected from the group consisting of the structures represented by the structural formulae (Z101) and (Z102), a hydrogen atom, or a monovalent hydrocarbon group having 1 to 4 carbon atoms, Z12 represents any structure selected from the group consisting of the structures represented by the structural formulae (Z101) and (Z102), or a monovalent hydrocarbon group having 1 to 4 carbon atoms, d3 represents an integer of 0 to 2, and when d3 is 2, Z12 may be the same or different from each other; provided that at least one of Z9 to Z12 is any structure selected from the group consisting of the structures represented by the structural formulae (Z101) and (Z102);

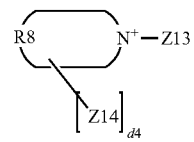

Structural Formula (5)

wherein R8 represents a divalent hydrocarbon group necessary for forming a nitrogen-containing aromatic ring together with a nitrogen atom to which R8 is bonded, Z13 represents any structure selected from the group consisting of the structures represented by the structural formulae (Z101) and (Z102), a hydrogen atom, or a monovalent hydrocarbon group having 1 to 4 carbon atoms, Z14 represents any structure selected from the group consisting of the structures represented by the structural formulae (Z101) and (Z102), or a monovalent hydrocarbon group having 1 to 4 carbon atoms, and d4 represents an integer of 0 or 1, provided that at least one of Z13 and Z14 is any structure selected from the group consisting of the structures represented by the structural formulae (Z101) and (Z102);

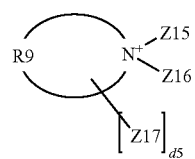

Structural Formula (6)

wherein R9 represents a divalent hydrocarbon group necessary for forming a nitrogen-containing alicyclic group together with a nitrogen atom to which R9 is bonded, Z15 and Z16 each independently represent any structure selected from the group consisting of the structures represented by the structural formulae (Z101) and (Z102), a hydrogen atom, or a monovalent hydrocarbon group having 1 to 4 carbon atoms, Z17 represents any structure selected from the group consisting of the structures represented by the structural formulae (Z101) and (Z102), or a hydrocarbon group having 1 to 4 carbon atoms, and d5 represents an integer of 0 or 1, provided that at least one of Z15 to Z17 is any structure selected from the group consisting of the structures represented by the structural formulae (Z101) and (Z102); and

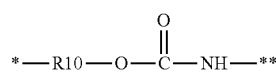

Structural Formula (Z101)

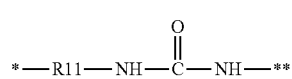

Structural Formula (Z102)

wherein R10 and R11 each independently represent a divalent hydrocarbon group having a straight chain or a branch, the symbol "*" represents a bonding site for bonding to a nitrogen atom in the structural formula (1), or a bonding site for bonding to a nitrogen atom in a nitrogen-containing heterocyclic ring or a carbon atom in the nitrogen-containing heterocyclic ring in the structural formulae (2) to (6), and the symbol "**" represents a bonding site for bonding to a carbon atom in a polymer chain constituting the resin having a cationic structure.

2. The electrophotographic member according to claim 1, wherein
when a peak top temperature of a thermal chromatogram derived from the first resin in the first area is defined as T1 (° C.), and
a peak top temperature of a thermal chromatogram derived from the first resin included in a second area is defined as T2 (° C.), the second area being an area that is 0.1 μm thick from a back surface of the elastic layer on a side facing the substrate toward the outer surface,
T1 and T2 satisfy a relationship represented by the following relational expression (2):

$$T1 > T2 \qquad (2).$$

3. The electrophotographic member according to claim 1, wherein a monomer that forms the second polymer is a bifunctional monomer.

4. The electrophotographic member according to claim 1, wherein the elastic layer contains carbon black having a volatile content of 0.4% or more.

5. The electrophotographic member according to claim 1, wherein the cationic structure includes a nitrogen-containing aromatic ring.

6. An electrophotographic member comprising an electroconductive substrate, and an elastic layer as a surface layer, the elastic layer being constituted by a single-layer, wherein
the elastic layer comprises a first resin, a second resin and an anion,
the first resin is a crosslinked urethane resin, and the crosslinked urethane resin has at least one cationic structure selected from the group consisting of the following structural formulae (1) to (6) in a molecule,
the second resin is at least one of a crosslinked acrylic resin having an ether bond and a crosslinked epoxy resin having an ether bond,
a first area in the elastic layer, the first area being from an outer surface of the elastic layer to a depth of 0.1 μm, includes the first resin and the second resin, and
when a peak top temperature of a thermal chromatogram derived from the second resin measured from a first sample sampled from the first area is defined as A1 (° C.), and
a peak top temperature of a thermal chromatogram derived from the second resin measured from a second sample obtained by decomposing the first resin contained in the sample is defined as A2 (° C.),
A1 and A2 satisfy a relationship represented by the following relational expression (1):

$$A1 > A2 \qquad (1)$$

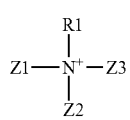

Structural Formula (1)

wherein R1 represents a hydrogen atom, or a monovalent hydrocarbon group having 1 to 4 carbon atoms, and Z1 to Z3 each independently represent any structure selected from the group consisting of structures represented by structural formulae (Z101) and (Z102), or a monovalent hydrocarbon group having 1 to 4 carbon atoms, provided that at least one of Z1 to Z3 is any structure selected from the group consisting of the structures represented by the structural formulae (Z101) and (Z102);

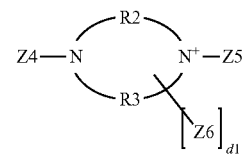

Structural Formula (2)

wherein R2 and R3 each represent a divalent hydrocarbon group necessary for forming a nitrogen-containing heteroaromatic five-membered ring together with a nitrogen atom to which each is bonded, Z4 and Z5 each independently represent any structure selected from the group consisting of the structures represented by the structural formulae (Z101) and (Z102), a hydrogen atom, or a monovalent hydrocarbon group having 1 to 4 carbon atoms, Z6 represents any structure selected from the group consisting of the structures represented by the structural formulae (Z101) and (Z102), or a monovalent hydrocarbon group having 1 to 4 carbon atoms, and d1 represents an integer of 0 or 1, provided that at least one of Z4 to Z6 is any structure selected from the group consisting of the structures represented by the structural formulae (Z101) and (Z102);

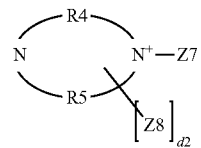

Structural Formula (3)

wherein R4 and R5 each represent a divalent hydrocarbon group necessary for forming a nitrogen-containing heteroaromatic six-membered ring together with a nitrogen atom to which each is bonded, Z7 represents any structure selected from the group consisting of the structures represented by the structural formulae (Z101) and (Z102), a hydrogen atom, or a monovalent hydrocarbon group having 1 to 4 carbon atoms, Z8 represents any structure selected from the group consisting of the structures represented by the structural formulae (Z101) and (Z102), or a monovalent hydrocarbon group having 1 to 4 carbon atoms, d2 represents an integer of 0 to 2, and when d2 is 2, Z8 may be the same or different from each other; provided that at least one of Z7 and Z8 is any structure selected from the group consisting of the structures represented by the structural formulae (Z101) and (Z102);

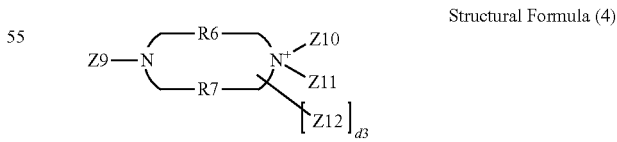

Structural Formula (4)

wherein R6 and R7 each represent a divalent hydrocarbon group necessary for forming a nitrogen-containing heteroalicyclic group together with a nitrogen atom to which each is bonded, Z9 to Z11 each independently represent any structure selected from the group consisting of the group consisting of the structures represented by the structural formulae (Z101) and (Z102), a hydrogen atom, or a monovalent hydrocarbon group having 1 to 4 carbon atoms, Z12 represents any structure selected from the group consisting of the structures represented by the structural formulae (Z101) and (Z102), or a monovalent hydrocarbon group having 1 to 4 carbon atoms, d3 represents an integer of 0 to 2, and when d3 is 2, Z12 may be the same or different from each other; provided that at least one of Z9 to Z12 is any structure selected from the group consisting of the structures represented by the structural formulae (Z101) and (Z102);

Structural Formula (5)

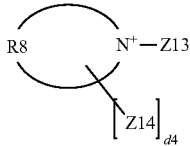

wherein R8 represents a divalent hydrocarbon group necessary for forming a nitrogen-containing aromatic ring together with a nitrogen atom to which R8 is bonded, Z13 represents any structure selected from the group consisting of the structures represented by the structural formulae (Z101) and (Z102), a hydrogen atom, or a monovalent hydrocarbon group having 1 to 4 carbon atoms, Z14 represents any structure selected from the group consisting of the structures represented by the structural formulae (Z101) and (Z102), or a monovalent hydrocarbon group having 1 to 4 carbon atoms, and d4 represents an integer of 0 or 1, provided that at least one of Z13 and Z14 is any structure selected from the group consisting of the structures represented by the structural formulae (Z101) and (Z102);

Structural Formula (6)

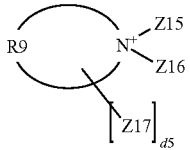

wherein R9 represents a divalent hydrocarbon group necessary for forming a nitrogen-containing alicyclic group together with a nitrogen atom to which R9 is bonded, Z15 and Z16 each independently represent any structure selected from the group consisting of the structures represented by the structural formulae (Z101) and (Z102), a hydrogen atom, or a monovalent hydrocarbon group having 1 to 4 carbon atoms, Z17 represents any structure selected from the group consisting of the structures represented by the structural formulae (Z101) and (Z102), or a hydrocarbon group having 1 to 4 carbon atoms, and d5 represents an integer of 0 or 1, provided that at least one of Z15 to Z17 is any structure selected from the group consisting of the structures represented by the structural formulae (Z101) and (Z102); and Structural Formula (Z101)

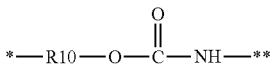

Structural Formula (Z102)

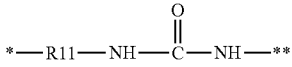

wherein R10 and R11 each independently represent a divalent hydrocarbon group having a straight chain or a branch, the symbol "*" represents a bonding site for bonding to a nitrogen atom in the structural formula (1), or a bonding site for bonding to a nitrogen atom in a nitrogen-containing heterocyclic ring or a carbon atom in the nitrogen-containing heterocyclic ring in the structural formulae (2) to (6), and the symbol "**" represents a bonding site for bonding to a carbon atom in a polymer chain constituting the resin having a cationic structure.

7. The electrophotographic member according to claim 6, wherein
when a peak top temperature of a thermal chromatogram derived from the first resin in the first area is defined as T1 (° C.), and
a peak top temperature of a thermal chromatogram derived from the first resin included in a second area is defined as T2 (° C.), the second area being an area that is 0.1 μm thick from a back surface of the elastic layer on a side facing the substrate toward the outer surface,
T1 and T2 satisfy a relationship represented by the following relational expression (2):

$$T1 > T2 \qquad (2).$$

8. The electrophotographic member according to claim 6, wherein a monomer that forms the second polymer is a bifunctional monomer.

9. The electrophotographic member according to claim 6, wherein the elastic layer contains carbon black having a volatile content of 0.4% or more.

10. The electrophotographic member according to claim 6, wherein the cationic structure includes a nitrogen-containing aromatic ring.

11. An electrophotographic process cartridge configured to be detachably attachable to a main body of an electrophotographic apparatus, comprising the electrophotographic member according to claim 1.

12. An electrophotographic image forming apparatus comprising:
an image carrier that carries an electrostatic latent image thereon;
a charging apparatus that primarily charges the image carrier;
an exposure apparatus that forms the electrostatic latent image on the image carrier that is primarily charged;
a developing member that develops the electrostatic latent image with toner to form a toner image; and
a transfer apparatus that transfers the toner image to a transfer material, wherein
the developing member is the electrophotographic member according to claim 1.

13. An electrophotographic process cartridge configured to be detachably attachable to a main body of an electrophotographic apparatus, comprising the electrophotographic member according to claim 6.

14. An electrophotographic image forming apparatus comprising:
an image carrier that carries an electrostatic latent image thereon;
a charging apparatus that primarily charges the image carrier;
an exposure apparatus that forms the electrostatic latent image on the image carrier that is primarily charged;
a developing member that develops the electrostatic latent image with toner to form a toner image; and
a transfer apparatus that transfers the toner image to a transfer material, wherein the developing member is the electrophotographic member according to claim 6.

\* \* \* \* \*